(12) United States Patent
Yu et al.

(10) Patent No.: US 11,050,920 B2
(45) Date of Patent: Jun. 29, 2021

(54) PHOTOGRAPHED OBJECT RECOGNITION METHOD, APPARATUS, MOBILE TERMINAL AND CAMERA

(71) Applicant: Alibaba Group Holding Limited, Grand Cayman (KY)

(72) Inventors: Wentao Yu, Zhejiang (CN); Chen Zhang, Zhejiang (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 16/112,240

(22) Filed: Aug. 24, 2018

(65) Prior Publication Data

US 2018/0367727 A1 Dec. 20, 2018

Related U.S. Application Data

(63) Continuation of application No. PCT/CN2017/073582, filed on Feb. 15, 2017.

(30) Foreign Application Priority Data

Feb. 26, 2016 (CN) .......................... 201610109132.7

(51) Int. Cl.
*H04N 5/232* (2006.01)
*G06K 9/20* (2006.01)
(Continued)

(52) U.S. Cl.
CPC ..... *H04N 5/23212* (2013.01); *G06K 9/00899* (2013.01); *G06K 9/20* (2013.01);
(Continued)

(58) Field of Classification Search
CPC .............. H04N 5/23219; H04N 5/232; H04N 5/232125; H04N 5/23212; H04N 5/23229;
(Continued)

(56) References Cited

U.S. PATENT DOCUMENTS

| 8,675,926 B2* | 3/2014 | Zhang ................ G06K 9/00906 382/118 |
| 8,958,607 B2* | 2/2015 | Juveneton .......... G06K 9/00906 382/117 |

(Continued)

FOREIGN PATENT DOCUMENTS

| CN | 1834986 A | 9/2006 |
| CN | 1968357 A | 5/2007 |

(Continued)

OTHER PUBLICATIONS

Translation of International Search Report dated May 19, 2017, from corresponding PCT Application No. CN2017/073582, 2 pages.

(Continued)

*Primary Examiner* — Lin Ye
*Assistant Examiner* — Tuan H Le
(74) *Attorney, Agent, or Firm* — Lee & Hayes, P.C.

(57) ABSTRACT

Methods, apparatuses, mobile terminals, and cameras for recognizing a photographed object are provided. The recognition method includes starting a photographing device of a terminal to auto-focus a photographed object in response to receiving a photographing instruction; obtaining a post-focusing focal distance of the photographing device after the photographing device successfully focuses on the photographed object; and determining whether an object type of the photographed object is a photograph based on the post-focusing focal distance. The present application resolves the technical problem of the high complexity associated with the schemes for recognizing a remade photograph in existing technologies.

16 Claims, 17 Drawing Sheets

(51) Int. Cl.
*G06K 9/00* (2006.01)
*G06T 7/571* (2017.01)

(52) U.S. Cl.
CPC ......... *G06T 7/571* (2017.01); *H04N 5/23219* (2013.01); *H04N 5/232125* (2018.08)

(58) Field of Classification Search
CPC .... H04N 5/2257; G06K 9/00899; G06K 9/20; G06K 9/00; G06T 7/571
See application file for complete search history.

(56) References Cited

U.S. PATENT DOCUMENTS

| | | | |
|---|---|---|---|
| 9,058,519 B2 | 6/2015 | Law et al. | |
| 9,396,537 B2 | 7/2016 | Hirvonen | |
| 9,679,212 B2 | 6/2017 | Kim et al. | |
| 9,786,030 B1* | 10/2017 | Binder | G06T 3/0093 |
| 2005/0189419 A1* | 9/2005 | Igarashi | H04N 5/23212 |
| | | | 235/454 |
| 2007/0113099 A1* | 5/2007 | Takikawa | G06K 9/00221 |
| | | | 713/186 |
| 2011/0064313 A1* | 3/2011 | Lee | H04N 5/23219 |
| | | | 382/195 |
| 2013/0101182 A1 | 4/2013 | Frischholz et al. | |
| 2014/0169642 A1* | 6/2014 | Law | G06K 9/00597 |
| | | | 382/117 |
| 2014/0270404 A1* | 9/2014 | Hanna | G06K 9/00906 |
| | | | 382/116 |
| 2015/0324629 A1* | 11/2015 | Kim | G06K 9/00268 |
| | | | 382/203 |
| 2016/0371555 A1* | 12/2016 | Derakhshani | G06K 9/00228 |
| 2017/0109513 A1* | 4/2017 | Skogo | G06K 9/00604 |
| 2018/0158269 A1* | 6/2018 | Friedman | G06K 9/00228 |

FOREIGN PATENT DOCUMENTS

| | | |
|---|---|---|
| CN | 104767937 A | 7/2015 |
| CN | 104931957 A | 9/2015 |
| CN | 105117729 A | 12/2015 |
| EP | 1703440 | 9/2006 |
| EP | 1835433 | 9/2007 |
| JP | 2007157115 A | 6/2007 |
| JP | 2007280367 A | 10/2007 |
| JP | 2008283258 A | 11/2008 |
| JP | 2011039206 A | 2/2011 |
| JP | 2015173327 A | 10/2015 |
| WO | WO2018009568 | 1/2018 |

OTHER PUBLICATIONS

Translation of Written Opinion dated May 19, 2017, from corresponding PCT Application No. CN2017/073582, 6 pages.
Translation of Chinese Office Action from corresponding CN Application 201610109132.7 dated Oct. 9, 2019, a counterpart foreign application for U.S. Appl. No. 16/112,240, 7 pages.
Translation of Chinese Office Action from corresponding CN Application 201610109132.7 dated Mar. 5, 2019, a counterpart foreign application for U.S. Appl. No. 16/112,240, 7 pages.
Translation of Chinese Search Report from corresponding CN Application 201610109132.7 dated Mar. 5, 2019, a counterpart foreign application for U.S. Appl. No. 16/112,240, 3 pages.
The Extended European Search Report dated Jul. 22, 2019 for European Patent Application No. 17755762.6, a counterpart of U.S. Appl. No. 16/112,240, 6 pages.
Japanese Office Action dated Mar. 30, 2021 for Japanese Patent Application No. 2018-544870, a foreign counterpart to U.S. Appl. No. 16/112,240, 10 pages.
Translation of Chinese 3rd Office Action from corresponding CN Application 201610109132.7 dated Apr. 2, 2020, a counterpart foreign application for U.S. Appl. No. 16/112,240, 8 pages.
Translation of Chinese 4th Office Action from corresponding CN Application 201610109132.7 dated Oct. 13, 2020, a counterpart foreign application for U.S. Appl. No. 16/112,240, 12 pages.

* cited by examiner

PHOTOGRAPHED OBJECT RECOGNITION METHOD, APPARATUS, MOBILE TERMINAL AND CAMERA

CROSS REFERENCE TO RELATED PATENT APPLICATIONS

This application claims priority to and is a continuation of PCT Patent Application No. PCT/CN2017/073582 filed on 15 Feb. 2017, and is related to and claims priority to Chinese Patent Application No. 201610109132.7, filed on 26 Feb. 2016, entitled "Photographed Object Recognition Method, Apparatus, Mobile Terminal and Camera," which are hereby incorporated by reference in their entirety.

TECHNICAL FIELD

The present application relates to the technical field of information security, and particularly to photographed object recognition methods, apparatuses, mobile terminals and cameras.

BACKGROUND

In business, a user is often used to provide real identity authentication, such as a Taobao shop certification, an Alipay real name certification, and a real name authentication of Mybank, etc. For example, opening accounts in securities companies, and opening bank credit card accounts, etc., all require users to provide real identity information, and identity information that is generally required to be provided includes site photographs of principals when certification is performed, photographs of identification cards, etc. The "real identity information" herein not only means that documents and photographs are authentic, but also requires that users of these documents are principals of these documents themselves.

For example, in Taobao certification services for opening a shop, Taobao members who do certification need to use mobile phones to take photographs of the members and identification cards of the members themselves, who are submitted to Taobao for review. In a process of submission, a member submits authentication data using mobile Taobao or a mobile application of Ali money shield. In these applications, the member is restricted to use only a camera of a mobile phone on the spot and could not upload a photograph from an album of the mobile phone. Under normal circumstances, this type of restriction must use a current shooting situation of the mobile phone, and can exclude most members doing malicious authentication. However, the following situations will still occur. A malicious user uses a photograph and identification card photograph of another that are purchased from an unlawful market or that are illegally collected and stolen, and then uses a camera of a mobile phone to remake these photographs to perform certification of opening a shop in Taobao during a certification process.

In order to solve the above problem of remaking photographs, using biometrics to identify a remade photograph is proposed in existing technologies, and includes the following two methods. The first method refers to a fingerprint verification method, i.e., verifying whether a fingerprint exists in a photograph using a hardware facility of fingerprints verification, and the photograph is a remade photograph if the fingerprint exists. The second method refers to a video live detection method, i.e., a system randomly giving a series of standard actions, such as shaking head, nodding, blinking, opening mouth, etc., and using an intelligent pattern recognition algorithm to verify when a person that is captured is a real person, and not a photograph.

The above two methods can achieve the effect of identifying or filtering out remade photographs, but all have their own disadvantages. The fingerprint verification method of the first method requires additional new hardware. The video live detection method of the second method requires an additional software package and a complicated face detection algorithm, and a situation in which a failure of identification by the algorithm exists.

In view of the high complexity of the methods for identifying remade photographs in the existing technologies, no effective solution has been proposed yet.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Embodiments of the present application provide a method, an apparatus, a mobile terminal, and a camera for recognizing a photographed object, so as to at least solve the technical problem of the high complexity of the schemes for recognizing a remade photograph in the existing technologies.

According to the embodiments of the present application, a method for recognizing a photographed object is provided. The method includes starting a photographing device of a terminal to auto-focus a photographed object in response to receiving a photographing instruction; obtaining a post-focusing focal distance of the photographing device after the photographing device successfully focuses on the photographed object; and determining whether an object type of the photographed object is a photograph based on the post-focusing focal distance.

According to the embodiments of the present application, an apparatus for recognizing a photographed object is provided. The apparatus includes an activation module configured to start a photographing device of a terminal to auto-focus a photographed object in response to receiving a photographing instruction; an acquisition module configured to obtain a post-focusing focal distance of the photographing device after the photographing device successfully focuses on the photographed object; and a judgment module configured to determine whether an object type of the photographed object is a photograph based on the post-focusing focal distance.

According to the embodiments of the present application, a mobile device is also provided. The mobile terminal includes the apparatus for recognizing a photographed object as described above.

According to the embodiments of the present application, a camera is also provided. The camera includes the apparatus for recognizing a photographed object as described above.

In the embodiments of the present application, an auto-focus function of a photographing device of a terminal is used. After the photographing device successfully focuses on a photographed object, a determination is made as to whether an object type of the photographed object is a photograph based on a focal distance after the photographing device sets a focus. According to the foregoing embodiments, whether an object type of a photographed object is a photograph can be determined by using a focal distance after auto-focusing by a photographing device. Compared with the methods for recognizing a remade photograph in the existing technologies, no additional hardware is required on a basis of a photographing device, and a software process is relatively simple, simplifying a process of recognizing a remade photograph, and solving the technical problem of the high complexity of the schemes for recognizing a remade photograph in the existing technologies.

BRIEF DESCRIPTION OF THE DRAWINGS

Drawings described herein are provided for further understanding of the present application, and constitute a part of the present application. Exemplary embodiments of the present application and descriptions thereof are used to explain the present application, and do not constitute improper limitations to the present application. In the drawings.

DETAILED DESCRIPTION

In order to enable one skilled in the art to better understand the solutions of the present application, the technical solutions in the embodiments of the present application will be described clearly and completely in conjunction with the drawings in the embodiments of the present application. Apparently, the described embodiments merely represent a part and not all of the embodiments of the present application. Based on the embodiments of the present application, all other embodiments obtained by one of ordinary skill in the art without making any creative effort shall fall within the scope of protection of the present application.

It should be noted that terms "first", "second", and the like in the specification and claims of the present application and the drawings as described above are used to distinguish similar objects and are not necessarily used to describe a specific sequence or order. It should be understood that data used in this way may be interchanged where appropriate, so that the embodiments of the present application described herein can be implemented in orders other than the orders illustrated or described herein. In addition, terms "include" and "have" and any variations thereof are intended to cover non-exclusive inclusions. For example, a process, method, system, product or apparatus including a series of operations or units need not be limited to those operations or units explicitly listed, and may include other operations or units that are not explicitly listed or are inherent to the process, method, product or apparatus.

First, relevant principles involved in the present application are explained as follows.

Figure 1:
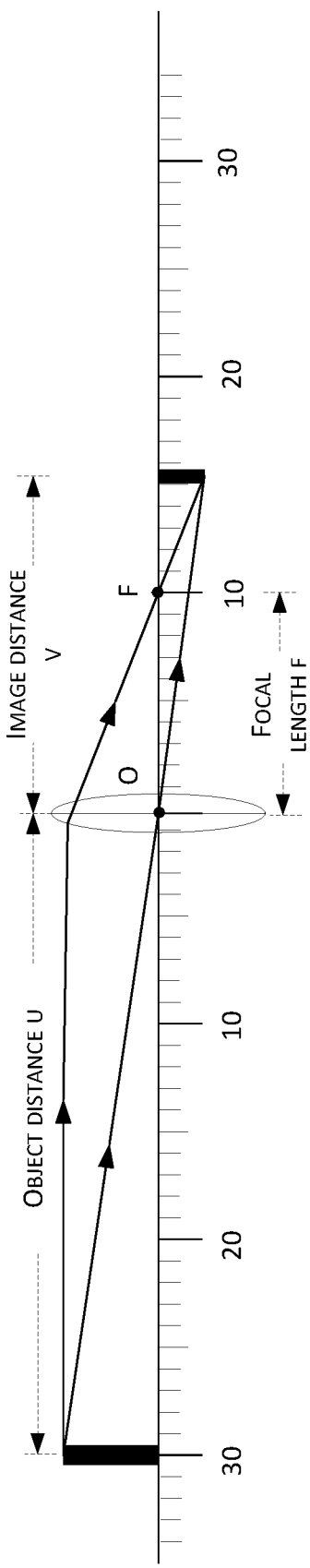
FIG. 1 is a schematic diagram of principles of a method for recognizing a photographed object according to the embodiments of the present application.

Optical imaging principle: As shown in FIG. 1, through a convex lens, an image of an original object is formed behind the convex lens for the original object. A point F in FIG. 1 is a focal point, which is a point where the light parallel to a main optical axis passes through the convex lens and converges on the main optical axis. A point O in FIG. 1 is an optical center, that is, the center of the convex lens. A distance u in FIG. 1 is an object distance, which is used to represent a distance from the object to the center of the convex lens. A distance f is a focal length and is used to represent a distance from the focal point to the optical center. A distance v is an image distance and is used to represent a distance from the image formed by the convex lens to the optical center. The object distance, the image distance and the focal length satisfy an imaging formula: 1/u (object distance)+1/v (image distance)=1/f (lens' focal length). When u>2*f and f<v<2*f, an imaging relationship of a camera is met.

Figure 2:
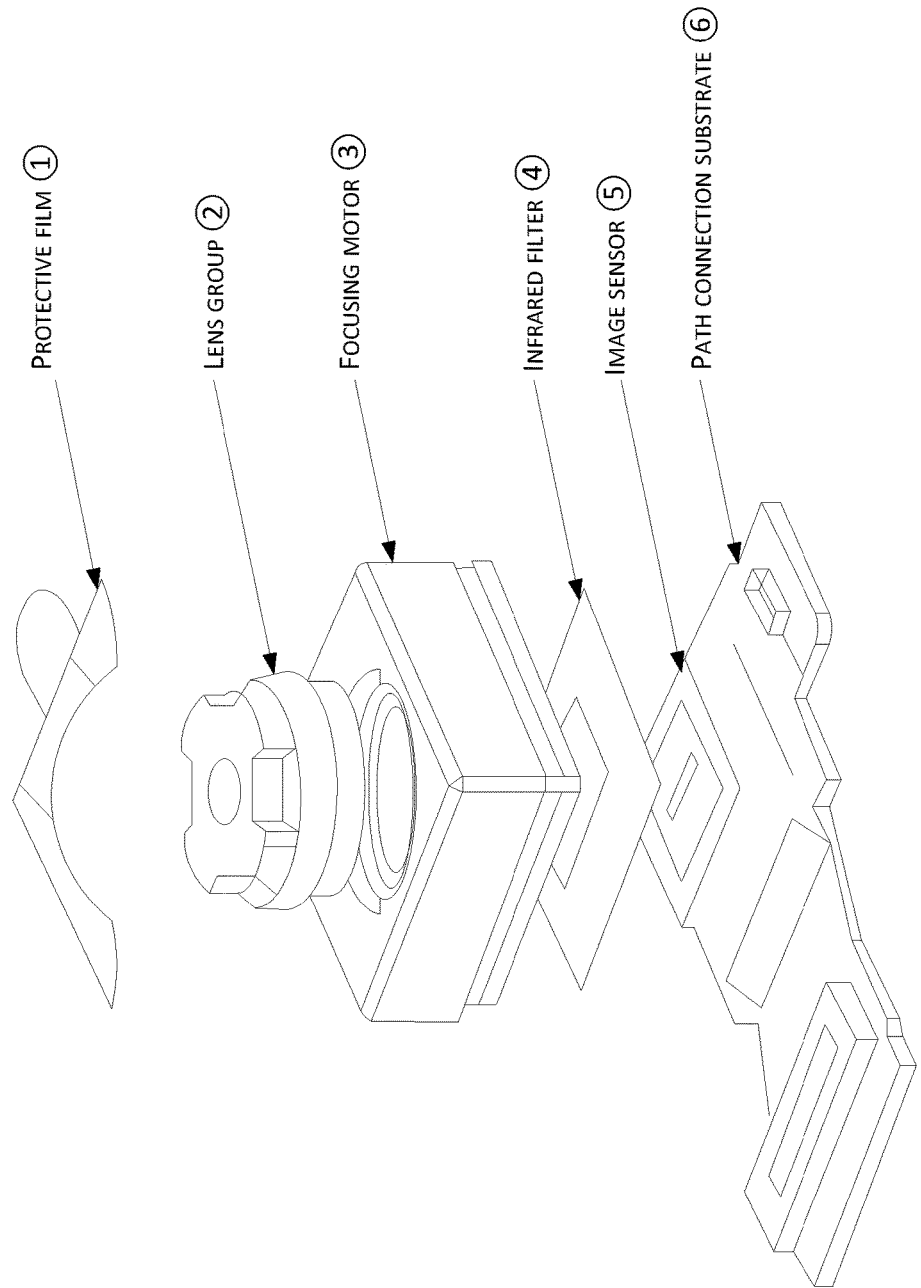
FIG. 2 is a schematic diagram of an internal structure of a photographing apparatus of a terminal according to the embodiments of the present application.

Auto-focus mode: A camera 200 of a mobile phone may include a protective film ①, a lens group ②, a focusing motor ③, an infrared filter ④, an image sensor ⑤, and a path connection substrate ⑥, as shown in FIG. 2. As shown in FIG. 2, a focal length of a camera of a terminal may be fixed. In order to take a clear picture, the camera of the mobile phone may move the image distance v to achieve the purpose of a clear image. In this type of camera, focusing is achieved by moving the image sensor back and forth through the focusing motor. Under normal circumstances, a distance that the focusing motor can move is several hundred micrometers, which reflects a range that the camera can focus on. The image sensor is generally a cmos (complementary metal-oxide semiconductor) component, i.e., a photosensitive element.

First Embodiment

According to the embodiments of the present application, an embodiment of a method for identifying a photographed object is further provided. It should be noted that operations shown in a flowchart of a drawing may be executed in a computer system such as a set of computer executable instructions. Also, although a logical order is shown in a flowchart, in some cases, operations may be executed in an order different from the one illustrated or described therein.

Figure 3:
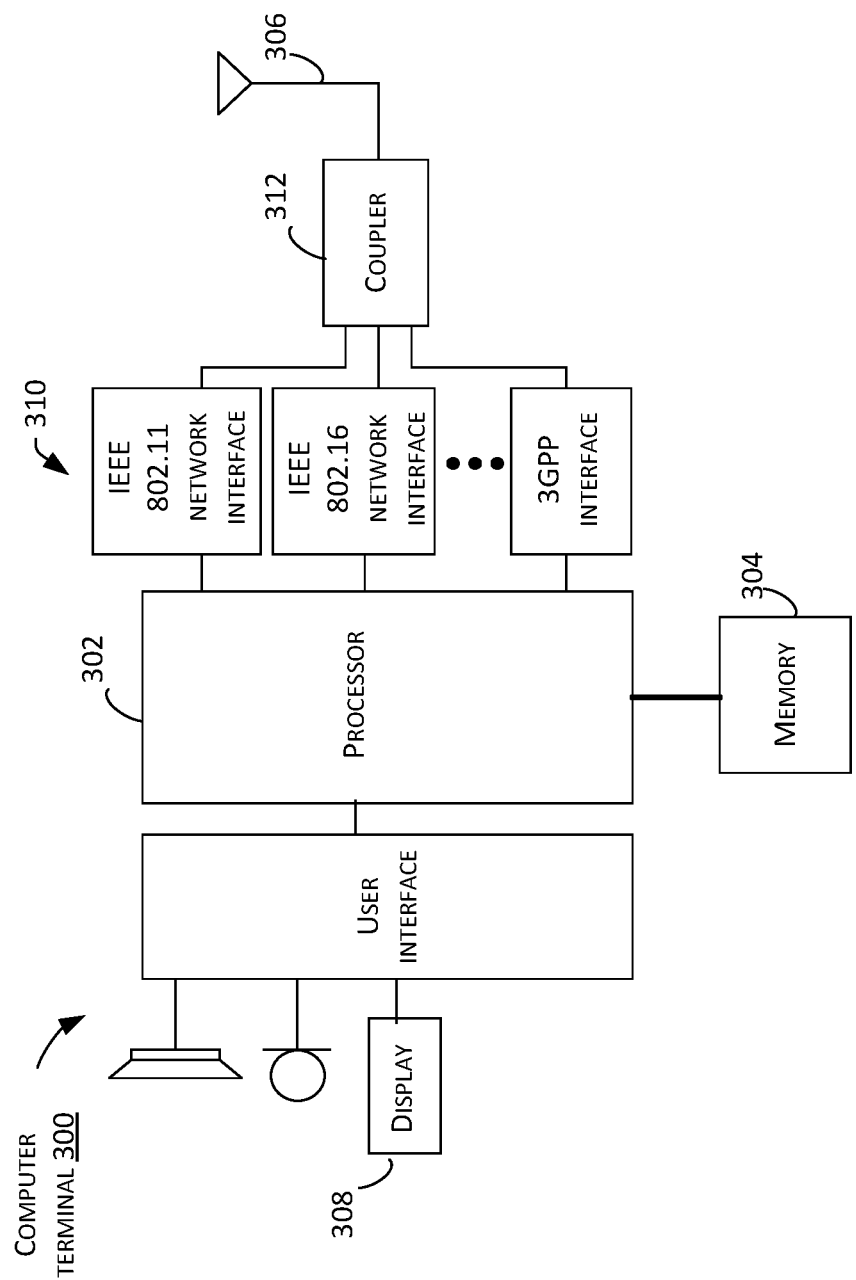
FIG. 3 is a structural block diagram of a computer terminal according to a method for recognizing a photographed object according to the embodiments of the present application.

The method embodiment provided in the first embodiment of the present application may be executed in a mobile terminal, a computer terminal, or a similar computing device. Running on a computer terminal is used as an example. FIG. 3 is a structural block diagram of a computer terminal 300 according to a method for recognizing a photographed object according to the embodiments of the present application. As shown in FIG. 3, a computer terminal 300 may include one or more (only one is shown in the figure) processors 302 (the processor 302 may include, but is not limited to, a processing device such as a microprocessor MCU or a programmable logic device FPGA), memory 304 used for storing data, and a transmission device 306 used for communication functions. In implementations, the computer terminal 300 may further include a display 308, one or more network interfaces 310, and a coupler 312. One of ordinary skill in the art can understand that the structure shown in FIG. 3 is only an illustration, which does not limit the structure of the above electronic device. For example, the computer terminal 30 may also include more or fewer components than those shown in FIG. 3, or have a different configuration than the one shown in FIG. 3.

The memory 304 may be configured to store software programs and modules of application software, such as program instructions/modules corresponding to the method of recognizing a photographed object in the embodiments of the present application. The processor 302 executes various functions, applications and data processing, i.e., the above-described method of recognizing the photographed object by running software program(s) and module(s) stored in the memory 304. The memory 304 may include a high-speed random access memory, and may also include a non-volatile memory such as one or more magnetic storage devices, flash memory, or other non-volatile solid-state memory. In some examples, the memory 304 may further include storage devices remotely disposed with respect to the processor 302. These storage devices may be connected to the computer terminal 30 via a network. Examples of such networks include, but are not limited to, the Internet, an intranet, a local area network, a mobile communications network, and a combination thereof.

The transmission device 306 is configured to receive or transmit data via a network. A specific example of the above-mentioned network may include a wireless network provided by a communication provider of the computer terminal 30. In one example, the transmission device 306 includes a network interface controller (NIC) that can be connected to other network devices through a base station so as to communicate with the Internet. In one example, the transmission device 306 may be a Radio Frequency (RF) module, which is configured to communicate with the Internet in a wireless manner.

Figure 4:
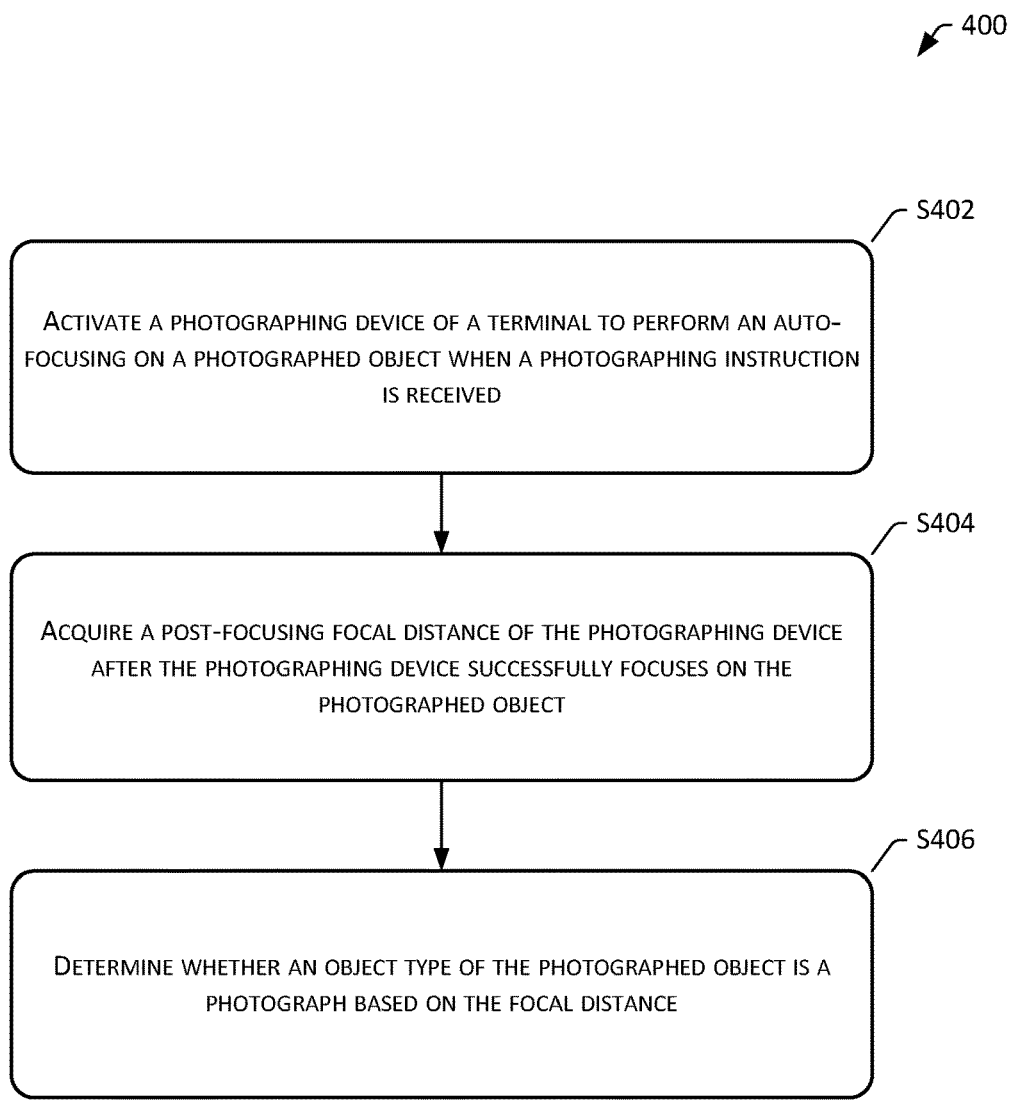
FIG. 4 is a flowchart of a method for recognizing a photographed object according to the embodiments of the present application.

Under the above operating environment, the present application provides an embodiment of a method for recognizing a photographed object as shown in FIG. 4. FIG. 4 is a flowchart of a method 400 for recognizing a photographed object according to the embodiments of the present application. As shown in FIG. 4, the method 400 may include the following operations.

Operation S402: Activate a photographing device of a terminal to perform an auto-focusing on a photographed object when a photographing instruction is received.

Operation S404: Acquire a post-focusing focal distance of the photographing device after the photographing device successfully focuses on the photographed object.

Operation S406: Determine whether an object type of the photographed object is a photograph based on the focal distance.

Using the embodiments of the present application, an auto-focus function of a photographing device of a terminal is used. After the photographing device successfully focuses on a photographed object, a determination is made as to whether an object type of the photographed object is a photograph based on a focal distance after the photographing device sets a focus. Through the foregoing embodiments, whether an object type of a photographed object is a photograph can be determined by using a focal distance after auto-focusing by a photographing device. Compared with the methods for recognizing a remade photograph in the existing technologies, no additional hardware is required on a basis of a photographing apparatus, and a software process is relatively simple, simplifying a process of recognizing a remade photograph, and solving the technical problem of the high complexity of the schemes for recognizing a remade photograph in the existing technologies. As such, an efficient recognition of remade photographs can be achieved.

The above terminal may be a personal computer or a mobile terminal, such as a mobile terminal with a photographing function, e.g., a mobile phone or a tablet computer. Optionally, the solutions of the present application may be implemented by a mobile terminal (such as a mobile phone) with a fixed-focus lens.

The above-mentioned focusing refers to an operation mode that changes a distance between an imaging surface and the lens according to differences in positions of clear images formed at the rear of the lens for different objects, that is, by changing an image distance to change the sharpness of a resulting image.

Specifically, when a user needs to take a photo, a photographing device of a terminal (such as a camera of a mobile phone) is activated. Using an auto-focus function of the photographing device, an auto-focus algorithm will drive a focusing motor to move an image sensor back and forth when a camera of the photographing device enters an auto-focus mode, to achieve the purpose of focusing to take and capture a clear image. Since a size of a photo is much smaller than a size of a real person, when taking a photo of a real people or remaking a photo, a distance between a photos and a camera of a photographing device is much smaller than a distance between the real people and the camera if sizes of imaging photos on a terminal are close to each other. This is reflected in the imaging formula, that is, an existence of a difference in object distances. Therefore, this difference in distances can be used to determine whether an object type of a photographed object of a photographing device is a photo or a real person.

Optionally, the above photographing instruction may be generated by a server or may be generated by a terminal. For example, after receiving an authentication request sent by a terminal, a server generates a photographing instruction to take a photograph of a user of the terminal. Optionally, a user activates a photographing device by operating a start button of the photographing device on a terminal, to take a photograph. Such operation can be a click operation.

A business process of Taobao authentication for opening a shop is used as an example hereinafter to describe the above embodiments of the present application in detail.

A mobile phone application (such as Ali money shield) prompts a user to take a photo, and the user clicks to start a photographing button. In a situation that a mobile phone supports an auto-focus function, a camera of the mobile phone automatically focuses on a photographed object. After an auto-focus is successful, the user clicks on a capture button. The camera of the mobile phone collects an image, and the mobile phone terminal generates image data corresponding to the image. The image data includes focal distance information after focusing and object distance information corresponding to focal distance information. A system of the mobile phone transmits the generated image data to a server of the mobile phone application (such as Ali money shield) through a network. The server uses the data sent by the terminal to determine whether a photographed object is a photo or a real person, thereby determining whether an identity of the user is authentic and valid.

In an alternative implementation, determining whether the object type of the photographed object is a photograph based on the post-focusing focal distance includes determining whether a distance between the photographing device and the photographed object is less than a preset threshold based on the post-focusing focal distance, where the preset threshold is used for representing a minimum distance needed for a photographing device to capture a living object, and the object type includes a living object and a photograph. If the distance between the photographing device and the photographed object is less than the preset threshold, the object type of the photographed object is determined to be a photograph.

Figure 5:
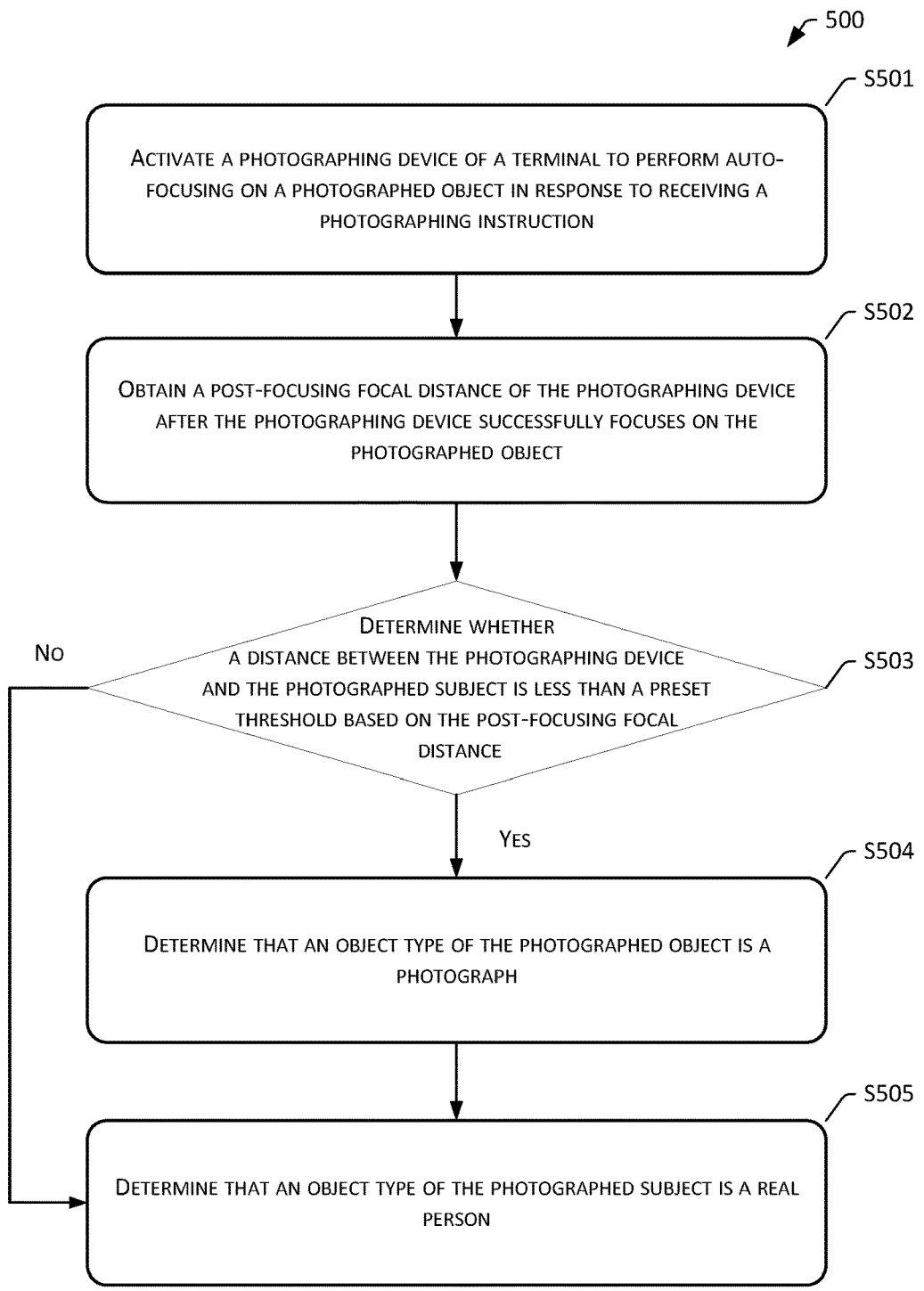
FIG. 5 is a flowchart of an alternative method for recognizing a photographed object according to the embodiments of the present application.

As shown in FIG. 5, a method 500 may include the following operations.

Operation S501: Activate a photographing device of a terminal to perform auto-focusing on a photographed object in response to receiving a photographing instruction.

Operation S502: Obtain a post-focusing focal distance of the photographing device after the photographing device successfully focuses on the photographed object.

Operation S503: Determine whether a distance between the photographing device and the photographed subject is less than a preset threshold based on the post-focusing focal distance.

Specifically, if the distance between the photographing device and the photographed object is determined to be less than the preset threshold, operation S504 is performed. If the distance between the photographing device and the photographed object is determined to be not less than the preset threshold, operation S505 is performed.

The preset threshold as mentioned above refers to a minimum distance needed between a photographing device and a photographed living object when the photographing device performs auto-focusing on the photographed living object (such as a real person) and forms a clear image behind a camera of the photographing device.

Operation S504: Determine that an object type of the photographed object is a photograph.

Operation S505: Determine that an object type of the photographed subject is a real person.

Specifically, when a user needs to take a photograph, a photographing device of a terminal is started. Through an auto-focus function of the photographing device, an auto-focus algorithm drives a focusing motor to move an image sensor back and forth when a camera of the photographing device enters an auto-focus mode to achieve the purpose of focusing, so that a clear image is captured. When the photographing device successfully focuses on a photographed object, a post-focusing focal distance of the photographing device can be obtained. The focal distance, an object distance, and an image distance satisfy an imaging formula: 1/u (object distance)+1/v (image distance)=1/f (focal length). Therefore, the object distance can be derived based on the post-focusing focal distance, and the photographed object can be determined to be a photograph or a living object (a real person) using the object distance.

For example, when a user uses an existing photograph to remake a photograph, a camera of a mobile phone needs to be closely attached to the photograph in order to get close to a size of an image of a real person without exposing any artifact of the photograph, due to size limitations of the existing photograph. By driving an image sensor to move using a focusing motor to capture a clear photograph, a result reflected in the imaging formula is that the object distance u becomes smaller and the image distance v becomes larger. A 10-inch photograph is used as an example. A distance between a camera of a mobile phone and the photograph is about 20 cm in order to take a clear picture without exposing any artifact. If a photograph of a real person is taken, a distance between the camera of the mobile phone and the real person is about 100 centimeters. By moving the image sensor using the focusing motor, the image distance v becomes smaller and a clear picture is taken. According to an analysis of the above content, a difference in object distances for remaking a photograph and a real person is about 5-10 times, which is reflected in the image distance v, showing a significant difference. Therefore, whether a photograph is a remade photograph can be identified through differences in object distances and image distances.

A distance of 100 cm between the camera of the mobile phone and the real person is taken as the preset threshold, for determining whether the photographed object of the mobile phone is a photograph. Specifically, after the camera of the mobile phone successfully focuses on the photographed object, a post-focusing focal distance is acquired by system software of the mobile phone. A distance between the mobile phone and the photographed object may be determined in conjunction with an imaging formula (i.e., the object distance as described above). When the object distance is less than 100 cm, a determination can be made that the photographed object is a photograph. When the object distance is more than 100 cm, the photographed object can be determined as a real person.

According to the above embodiments, a distance between a photographing device and a photographed object can be obtained using a focal distance after auto-focusing of the photographing device and an imaging formula. Based on the distance, whether an object type of the photographed object is a photograph can be directly determined. The principles of this technical solution are simple and clear, and an algorithm thereof is simple and easy to be implemented.

In an alternative implementation, determining whether the object type of the photographed object is a photograph based on the post-focusing focal distance includes determining whether a distance between the photographing device and the photographed object is less than a preset threshold based on the post-focusing focal distance, where the preset threshold is a minimum distance needed for the photographing device to capture a live object, and the object type includes a live object and a photograph; obtaining image data of the photographed object generated according to the photographing instruction if the distance between the photographing device and the photographed object is less than a preset threshold; detecting whether pre-acquired remade photograph feature(s) exist(s) in the image data; and determining that the object type of the photographing object is a photograph if pre-acquired remade photograph feature(s) exist(s) in the image data.

Figure 6:
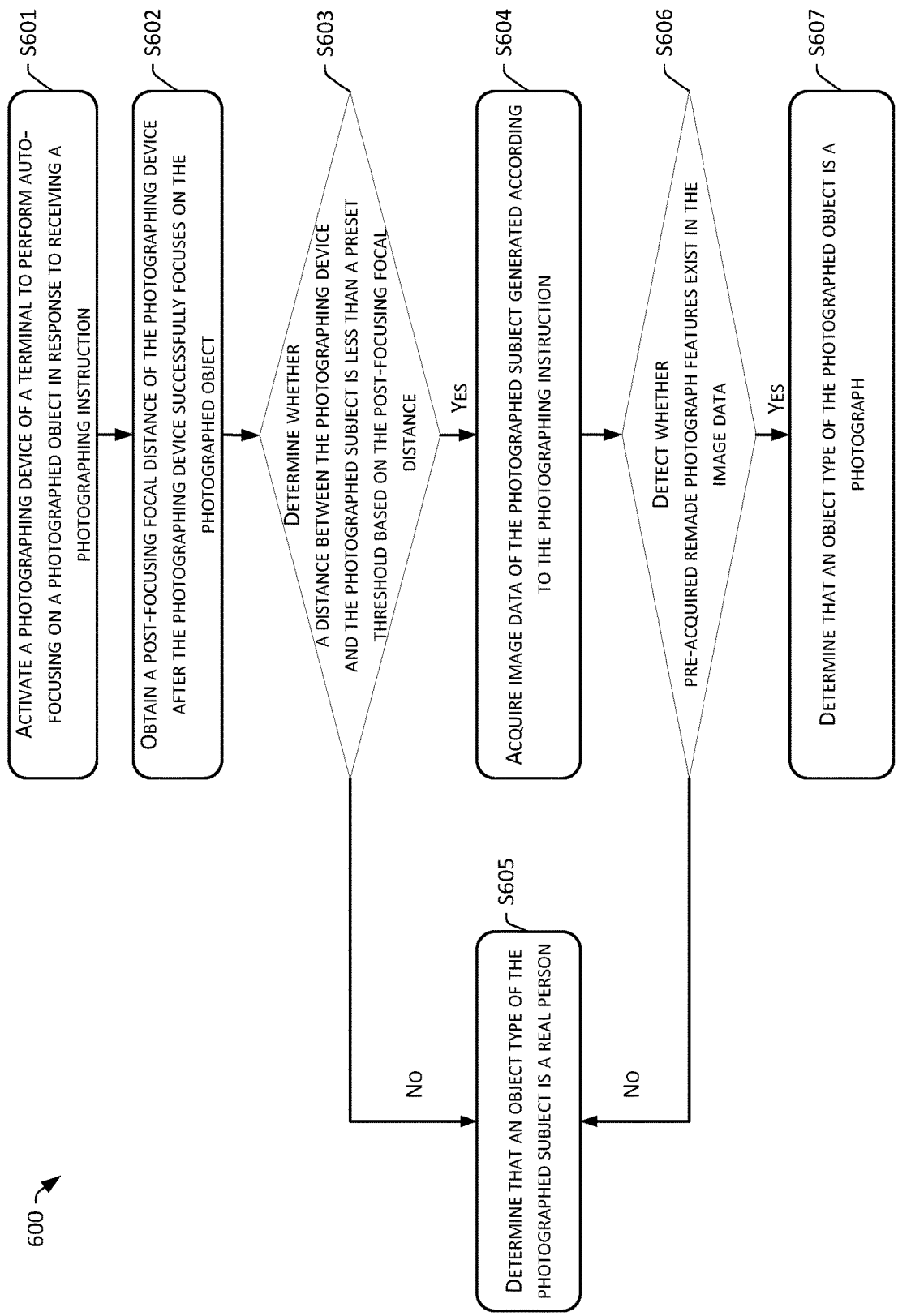
FIG. 6 is a flowchart of another alternative method for recognizing a photographed object according to the embodiments of the present application.

As shown in FIG. 6, a method 600 may include the following operations.

Operation S601: Activate a photographing device of a terminal to perform auto-focusing on a photographed object in response to receiving a photographing instruction.

Operation S602: Obtain a post-focusing focal distance of the photographing device after the photographing device successfully focuses on the photographed object.

Operation S603: Determine whether a distance between the photographing device and the photographed subject is less than a preset threshold based on the post-focusing focal distance.

Specifically, if the distance between the photographing device and the photographed object is determined to be less than the preset threshold, operation S604 is performed. If the distance between the photographing device and the photographed object is determined to be not less than the preset threshold, operation S605 is performed.

The preset threshold as mentioned above refers to a minimum distance needed between a photographing device and a photographed living object when the photographing device performs auto-focusing on the photographed living object (such as a real person) and forms a clear image behind a camera of the photographing device.

Operation S604: Acquire image data of the photographed subject generated according to the photographing instruction.

The image data includes a time of capturing the image, a resolution of the image, two-dimensional information or three-dimensional information in the image, fingerprint information on an image surface, and reflected light information on the image surface.

After acquiring the image data of the photographed subject generated according to the photographing instruction, operation S606 is performed.

Operation S605: Determine that an object type of the photographed subject is a real person.

Operation S606: Detect whether pre-acquired remade photograph features exist in the image data.

Specifically, if pre-acquired remade photograph features exist in the image data, operation S607 is performed. If no pre-captured remade photograph features exist in the image data, operation S605 is performed.

The pre-acquired remade photograph features include a resolution of an image, two-dimensional information in the image, fingerprint information on an image surface, and reflected light information on the image surface.

Operation S607: Determine that an object type of the photographed object is a photograph.

Optionally, a difference in resolution exists between a photograph taken by the remaking and a photograph of real person directly collected, and details of the difference are determined by a resolution of a camera of a photographing device. When resolution data of a remade photograph that is obtained in advance exists in the image data, a determination is made that an object type of the photographed object is a photograph.

Optionally, a reflection phenomenon exists on a remade photograph. After a light value is measured, the measured light value is compared with a reflection light value of a pre-acquired remade photograph. When the measured light value is greater than the reflection light value, an object type of the photographed object is determined to be a photograph.

Optionally, when the image data includes two-dimensional information of the image, a determination can be made that an object type of the photographed object is a photograph that can be represented by two-dimensional information in a two-dimensional space.

Optionally, when the image data includes fingerprint information (the fingerprint information refers to fingerprint information of contacts remaining on a remade photograph), this can indicate that an object type of the photographed object is a photograph.

According to the above embodiments, when pre-acquired remade photograph features in image data captured by a photographing device exist, an object type of a photographed object can be determined as a photograph. This solution only needs feature comparison and does not require a complicated algorithm, thus being simple and easy to be implemented.

In the above embodiments of the present application, determining whether the distance between the photographing device and the photographed object is less than the preset threshold based on the post-focusing focal distance includes determining whether the post-focusing focal distance is within a specified zoom range of the photographing device, where the specified zoom range corresponds to the preset threshold; and determining that the distance between the photographing device and the photographed object is less than the preset threshold if the post-focusing focal distance is within the specified zoom range of the photographing device.

The specified zoom range refers to an auto-focus range corresponding to a distance between the photographing device and the photographed living entity when a clear image is formed behind a camera of the photographing device.

Specifically, when a user needs to take a photograph, the user clicks a capture button to start a camera of a terminal (such as a mobile phone). When the mobile phone supports an auto-focus function, the camera of the mobile phone enters an auto-focus mode, and an auto-focus algorithm will drive a focusing motor to move an image sensor back and forth to achieve the purpose of auto-focusing. Since the focusing motor can move in a range of several hundred micrometers, an auto-focus range responding to the camera is very limited. If a focal distance returned by software of the mobile phone is within a specified zoom range of the camera, a corresponding distance between the photographing device and a photographed object is less than a preset threshold, that is, an object type of the photographed object at this time is a photograph.

For example, a corresponding preset threshold is 1 meter. When a camera of a mobile phone takes a picture of a real person of about 1 meter, a maximum value of a specified zoom range is taken when focusing, so as to form a clear image of this real person through the camera. As can be seen from the explanation of the above principles, taking a picture of a non-living object needs to be in a range of 0-1 m, or even a smaller range. If a certain photographed object is captured by the camera of the mobile phone, a focal distance of the camera returned by software of the mobile phone is within the specified zoom range after successful focusing. A determination can be made that an object distance between the camera and the photographed object at this time is less than 1 meter, and so the photographed object is determined to be a non-living object, such as a photograph.

In the above embodiments of the present application, activating the photographing device of the terminal to auto-focus the photographed object includes initializing the photographing device of the terminal in response to receiving the photographing instruction; detecting whether the photographing device of the terminal supports an auto-focus mode after the photographing device is initialized; and activating the auto-focus mode of the photographing device so that the photographing device automatically focuses on the photographed object in an event that the photographing device of the terminal supports the auto-focus mode is detected.

Furthermore, detecting whether the photographing device of the terminal supports the auto-focus mode includes calling a focus mode list of the photographing device; and detecting that the photographing device of the terminal supports an auto-focus mode if identification information of the auto-focus mode exists in the focus mode list.

Figure 7:
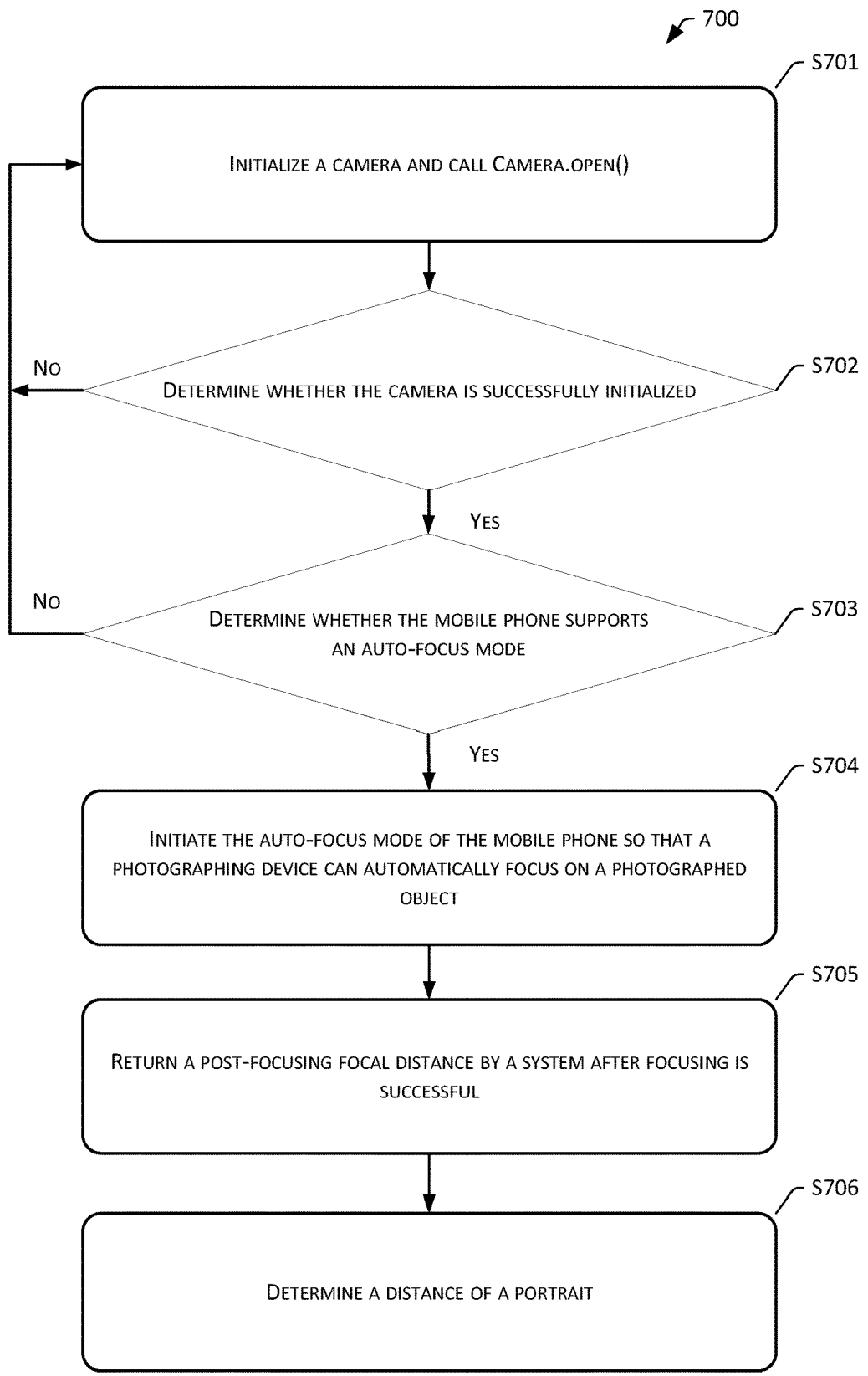
FIG. 7 is a flowchart of yet another alternative method of recognizing a photographed object according to the embodiments of the present application.

Optionally, the solution of the above embodiment may be implemented by a software algorithm provided by an Android system to acquire a focal distance of an auto-focus of a camera of a mobile phone. A process of a software algorithm 700 is shown in FIG. 7, which includes the following operations.

Operation S701: Initialize a camera and call Camera.open( ).

Specifically, when a user needs to take a photograph, an application of a mobile phone opens a camera of the mobile phone and initializes the camera by calling Camera.open( ).

Operation S702: Determine whether the camera is successfully initialized.

Specifically, if the camera is successfully initialized, operation S703 is performed. If the the camera fails to be initialized, operation S701 is returned and performed.

Operation S703: Determine whether the mobile phone supports an auto-focus mode.

Specifically, a way of determination is to call Camera. Parameters. Get Supported Focus Modes( ). This method returns a list (ie, the focus mode list as mentioned above), which can include at least one of the six focus modes as shown in Table 1.

TABLE 1

| FOCUS_MODE_AUTO | Auto-focus mode |
|---|---|
| FOCUS_MODE_INFINITY | Infinite-focus mode |
| FOCUS_MODE_MACRO | Macro-focus mode |
| FOCUS_MODE_FIXED | Fixed focus mode |
| FOCUS_MODE_EDOF | Full focus mode |
| FOCUS_MODE_ CONTINUOUS_VIDEO | Continuous video focus mode |

When the returned focus mode list includes FOCUS_MODE_AUTO or FOCUS_MODE_MACRO (i.e., identification information of the above-mentioned auto-focus mode), this represents that the mobile phone supports the auto-focus mode, and operation S704 is executed. When FOCUS_MODE_AUTO and FOCUS_MODE_MACRO, these two types of modes, are not included in the focus mode list, the mobile phone does not support the auto-focus mode. In this case, the above embodiment of the present application cannot be implemented, and the process returns to operation S701.

Operation S704: Initiate the auto-focus mode of the mobile phone so that a photographing device can automatically focus on a photographed object.

Specifically, when the auto-focus mode of the mobile phone is started, a focus mode parameter of the camera of the mobile phone is first set to FOCUS_MODE_AUTO, a method that is called is Camera. Parameters. Set Focus Mode (FOCUS_MODE_AUTO), and then auto focus (cb) is called to start auto-focus. A callback function cb is then registered, and a system calls this callback function after successful focusing.

Operation S705: Return a post-focusing focal distance by a system after focusing is successful.

Specifically, when the focusing is successful, the system automatically calls the callback function cb, and the callback function cb includes a core logic algorithm for determining a post-focusing focal distance. In an Android system, a method called Camera.get Focus Distances( ) is provided to return a post-focusing focal distance. In practical applications, a magnitude of the focal distance depends on an underlying camera hardware driver. If the underlying hardware does not provide this interface, this solution fails.

Operation S706: Determine a distance of a portrait.

Specifically, in a real scenario, since software associated with the fixed focus lens of the mobile phone has a very limited range of auto-focus capability, when a real image of about 1 meter is taken, a maximum value of a software zoom range is already reached. Therefore, according to a focal distance returned at operation S705, it can be regarded as remaking as long as the focal distance is determined to be less than the maximum value of the zoom range of the mobile phone.

Specifically, when a user needs to take a photograph, the user clicks a start-to-capture button to open a camera of a mobile phone in a mobile phone application, and initialize the camera by calling Camera.open( ). When the camera is successfully initialized, a determination is made as to whether the phone supports an auto-focus mode. A way of determination is to call Camera. Parameters. Get Supported Focus Modes( ). This method returns a list (i.e., a focus mode list as described above). When the returned focus mode list includes FOCUS_MODE_AUTO or FOCUS_MODE_MACRO (i.e., identification information of an auto-focus mode as described above), this represents that the mobile phone supports the auto-focus mode. When the mobile phone supports the auto-focus mode, the auto-focus mode of the mobile phone is activated, set a focus mode parameter of the camera of the mobile phone is set as FOCUS_MODE_AUTO, with a calling method as Camera. Parameters. Set Focus Mode(FOCUS_MODE_AUTO). When focusing is successful, a system will automatically call a callback function cb to return a post-focusing focal distance.

In the above embodiments, using relevant software interface provided by an Android system to acquire a focal distance of an auto-focus of a camera, a post-focusing focal distance of a camera of a mobile phone is returned. Based on this focal distance, an object type of a photographed object can be determined. The above embodiment has been tested and successfully implemented in a Samsung Galaxy Nexus handset.

It should be noted that the solutions of the present application may be used on a terminal that is installed with an Android operating system, or may be used on a terminal that is installed with an iOS (an abbreviation of iPhone Operating System, i.e., Apple's iOS operating system) operating system, and has an interface to obtain a focal distance when taking a photograph.

Information about a focal distance of an auto-focus of a camera can be obtained through a system interface on a terminal installed with an Android operating system.

As can be seen from the above embodiments, the method for recognizing a photographed object according to the present application is a recognition method based on a client side and has no coupling relationship with a service system. If a service system needs to be added in the method for recognizing a photographed object according to the present application because of risk control, when a function of detecting a remade photograph is performed, it is only necessary to embed a process of an existing service system into implementation operations of the method for recognizing a photographed object according to the present application, and report detection data to a backend system for analysis.

A service process of Taobao authentication for opening a shop is used as an example to describe the above embodiments of the present application in detail.

An application of a mobile phone (such as Ali Money Shield) prompts a user to take a portrait photograph, and the user needs to click a start-to-capture button. When the user opens a camera of the mobile phone in the application of the mobile phone, an interface of an Android system starts to initialize the camera. In an event that the camera is successfully initialized, a determination is made as to whether the mobile phone supports an auto-focus mode. Specifically, in a situation in which a focus mode list is retrieved and two types of modes (FOCUS_MODE_AUTO and FOCUS_MODE_MACRO) are included in the focus mode list, a determination is made that the mobile phone supports the auto-focus mode. After auto-focusing of the mobile phone is successful, a system automatically calls a callback function of the focusing that is set to return a post-focusing focal distance. When the user clicks on a capture button, the camera of the mobile phone collects an image, and the mobile phone terminal generates image data corresponding to the image. The image data includes information of the post-focusing focal distance and information of an object distance corresponding to information of the focal distance. The system of the mobile phone transmits the generated image data to a server of the application of the mobile phone (such as Ali money shield) through a network. The server determines whether the captured object is a photograph or a real person based on the data sent by the terminal, and thereby determines whether an identity of the user is authentic and valid.

Through the above embodiments, based on principles of optical imaging and imaging principles of a camera of an existing mobile phone, a post-focusing focal distance is derived. A distance between the camera of the mobile phone and a photographed object is obtained based on the focal distance. This distance is used to determine whether the photographed object is in a very close distance, that is, a final determination of whether it is the minimum distance necessary for a real person to take a half-length photograph. Compared with existing methods for recognizing a remade photograph, these solutions do not require additional hardware on a basis of a photographing device, and a software process is relatively simple, thus simplifying a process of recognizing a remade photograph, and solving the problem of high complexity of the schemes for recognizing a remade photograph in the existing technologies, so as to realize efficient recognition of remade photographs.

It should be noted that the foregoing method embodiments are all expressed as series of action combinations for the sake of description. However, one skilled in the art should know that the present application is not limited by the described action sequences, because certain operations may be performed in other orders or in parallel according to the present application. Moreover, one skilled in the art should also understand that the embodiments described in the specification all belong to preferred embodiments. Actions and modules involved therein may not necessarily be required by the present application.

Through the description of the above embodiments, one skilled in the art can clearly understand that the methods according to the above embodiments can be implemented by means of software plus a necessary general hardware platform. Apparently, hardware can also be used, but in many cases, the former is a better implementation. Based on such understanding, an essence of the technical solutions of the present application or the part contributing to the existing technologies may be embodied in a form of a software product. The computer software product is stored on a storage media (such as ROM/RAM, a magnetic disk, an optical disk, etc.), and includes instructions to cause a terminal device (which may be a mobile phone, a computer, a server, or a network device, etc.) to perform the method described in each embodiment of the present application.

Second Embodiment

Figure 8:
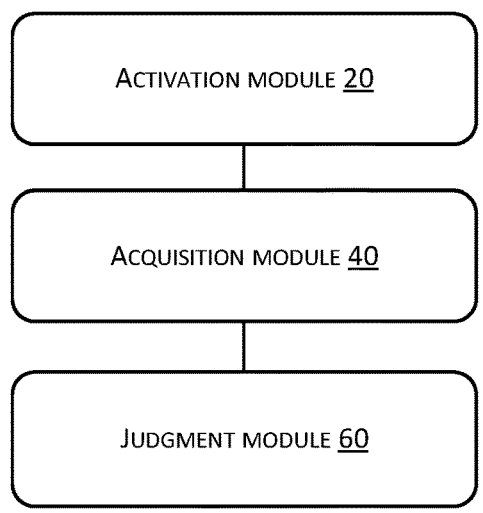
FIG. 8 is a schematic diagram of an apparatus for recognizing a photographed object according to the embodiments of the present application.

According to the embodiments of the present application, an embodiment of a recognition apparatus 800 for a photographed object is also provided. As shown in FIG. 8, the recognition apparatus 800 includes an activation module 20, an acquisition module 40, and a judgment module 60.

The activation module 20 is configured to activate a photographing device of a terminal to auto-focus a photographed object in response to receiving a photographing instruction.

The acquisition module 40 is configured to obtain a post-focusing focal distance of the photographing device after the photographing device successfully focuses on the photographed object.

The judgment module 60 is configured to determine whether an object type of the photographed object is a photograph based on the post-focusing focal distance.

Using the embodiments of the present application, an auto-focus function of a photographing device of a terminal is used. After the photographing device successfully focuses on a photographed object, a determination is made as to whether an object type of the photographed object is a photograph based on a focal distance after the photographing device sets a focus. Through the foregoing embodiments, whether an object type of a photographed object is a photograph can be determined by using a focal distance after auto-focusing by a photographing device. Compared with the methods for recognizing a remade photograph in the existing technologies, no additional hardware is required on a basis of a photographing apparatus, and a software process is relatively simple, simplifying a process of recognizing a remade photograph, and solving the technical problem of the high complexity of the schemes for recognizing a remade photograph in the existing technologies. As such, an efficient recognition of remade photographs can be achieved.

The above terminal may be a personal computer or a mobile terminal, such as a mobile terminal with a photographing function, e.g., a mobile phone or a tablet computer.

Optionally, the solutions of the present application may be implemented by a mobile terminal (such as a mobile phone) with a fixed-focus lens.

The above-mentioned focusing refers to an operation mode that changes a distance between an imaging surface and the lens according to differences in positions of clear images formed at the rear of the lens for different objects, that is, by changing an image distance to change the sharpness of a resulting image.

Specifically, when a user needs to take a photo, a photographing device of a terminal (such as a camera of a mobile phone) is activated. Using an auto-focus function of the photographing device, an auto-focus algorithm will drive a focusing motor to move an image sensor back and forth when a camera of the photographing device enters an auto-focus mode, to achieve the purpose of focusing to take and capture a clear image. Since a size of a photo is much smaller than a size of a real person, when taking a photo of a real people or remaking a photo, a distance between a photos and a camera of a photographing device is much smaller than a distance between the real people and the camera if sizes of imaging photos on a terminal are close to each other. This is reflected in the imaging formula, that is, an existence of a difference in object distances. Therefore, this difference in distances can be used to determine whether an object type of a photographed object of a photographing device is a photo or a real person.

Optionally, the above photographing instruction may be generated by a server or may be generated by a terminal. For example, after receiving an authentication request sent by a terminal, a server generates a photographing instruction to take a photograph of a user of the terminal. Optionally, a user activates a photographing device by operating a start button of the photographing device on a terminal, to take a photograph. Such operation can be a click operation.

Figure 9:
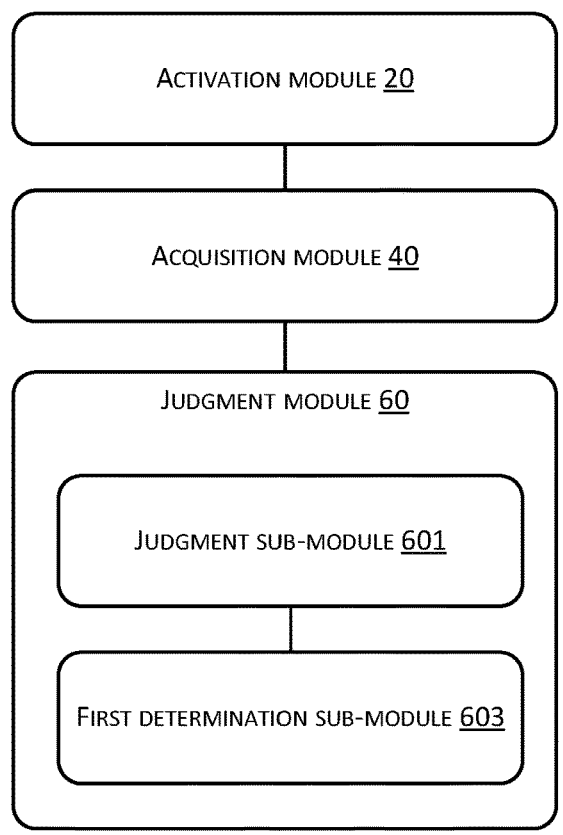
FIG. 9 is a schematic diagram of an alternative apparatus for recognizing a photographed object according to the embodiments of the present application.

In an alternative implementation, as shown in FIG. 9, the judgment module 60 includes a judgment sub-module 601 configured to determine whether a distance between the photographing device and the photographed object is less than a preset threshold based on the post-focusing focal distance, where the preset threshold is used for representing a minimum distance needed for a photographing device to capture a living object, and the object type includes a living object and a photograph; and a first determination sub-module 603 configured to determine that the object type of the photographed object a photograph if the distance between the photographing device and the photographed object is less than the preset threshold.

Specifically, when a user needs to take a photograph, a photographing device of a terminal is started. Through an auto-focus function of the photographing device, an auto-focus algorithm drives a focusing motor to move an image sensor back and forth when a camera of the photographing device enters an auto-focus mode to achieve the purpose of focusing, so that a clear image is captured. When the photographing device successfully focuses on a photographed object, a post-focusing focal distance of the photographing device can be obtained. The focal distance, an object distance, and an image distance satisfy an imaging formula: 1/u (object distance)+1/v (image distance)=1/f (focal length). Therefore, the object distance can be derived based on the post-focusing focal distance, and the photographed object can be determined to be a photograph or a living object (a real person) using the object distance.

According to the above embodiments, a distance between a photographing device and a photographed object can be obtained using a focal distance after auto-focusing of the photographing device and an imaging formula. Based on the distance, whether an object type of the photographed object is a photograph can be directly determined. The principles of this technical solution are simple and clear, and an algorithm thereof is simple and easy to be implemented.

Figure 10:
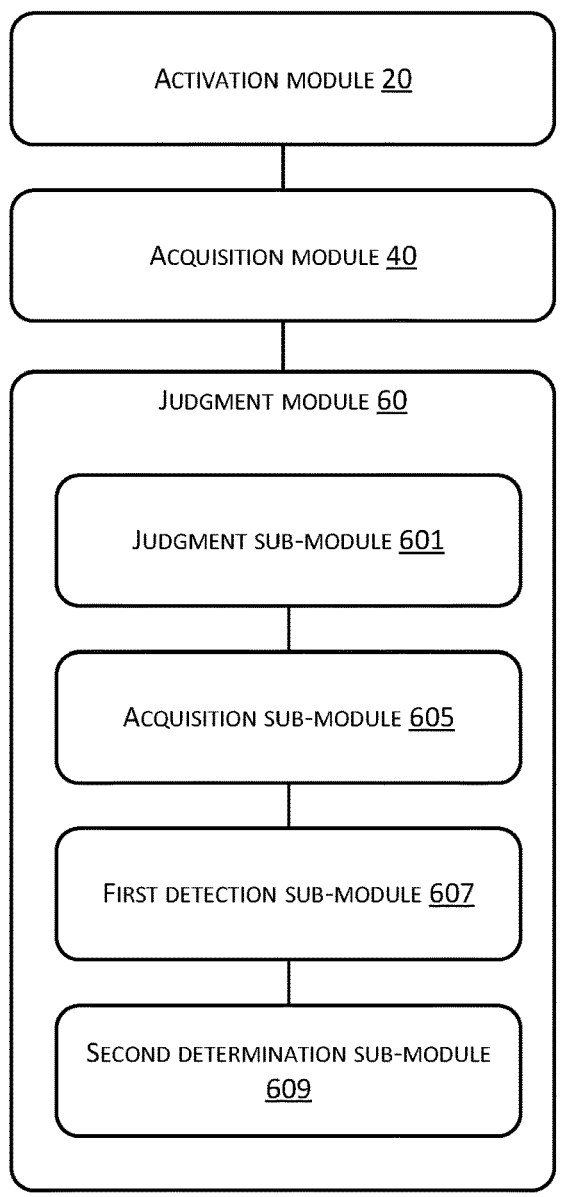
FIG. 10 is a schematic diagram of another alternative apparatus for recognizing a photographed object according to the embodiments of the present application.

In an alternative implementation, as shown in FIG. 10, the judgment module 60 includes a judgment sub-module 601 configured to determine whether a distance between the photographing device and the photographed object is less than a preset threshold based on the post-focusing focal distance, where the preset threshold is a minimum distance needed for the photographing device to capture a live object, and the object type includes a live object and a photograph; an acquisition sub-module 605 configured to obtain image data of the photographed object generated according to the photographing instruction if the distance between the photographing device and the photographed object is less than a preset threshold; a first detection sub-module 607 configured to detect whether pre-acquired remade photograph feature(s) exist(s) in the image data; and a second determination sub-module 609 configured to determine that the object type of the photographing object is a photograph if pre-acquired remade photograph feature(s) exist(s) in the image data.

According to the above embodiments, when pre-acquired remade photograph features in image data captured by a photographing device exist, an object type of a photographed object can be determined as a photograph. This solution only needs feature comparison and does not require a complicated algorithm, thus being simple and easy to be implemented.

Figure 11:
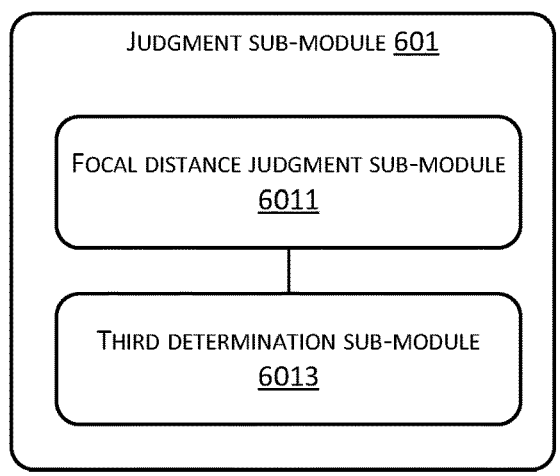
FIG. 11 is a schematic diagram of still another alternative apparatus for recognizing a photographed object according to the embodiments of the present application.

In the above embodiments of the present application, as shown in FIG. 11, the judgment sub-module 601 includes a focal distance judgment sub-module 6011 configured to determine whether the post-focusing focal distance is within a specified zoom range of the photographing device, where the specified zoom range corresponds to the preset threshold; and a third determination sub-module 6013 configured to determine that the distance between the photographing device and the photographed object is less than the preset threshold if the post-focusing focal distance is within the specified zoom range of the photographing device.

The specified zoom range refers to an auto-focus range corresponding to a distance between the photographing device and the photographed living entity when a clear image is formed behind a camera of the photographing device.

Specifically, when a user needs to take a photograph, the user clicks a capture button to start a camera of a terminal (such as a mobile phone). When the mobile phone supports an auto-focus function, the camera of the mobile phone enters an auto-focus mode, and an auto-focus algorithm will drive a focusing motor to move an image sensor back and forth to achieve the purpose of auto-focusing. Since the focusing motor can move in a range of several hundred micrometers, an auto-focus range responding to the camera is very limited. If a focal distance returned by software of the mobile phone is within a specified zoom range of the camera, a corresponding distance between the photographing device and a photographed object is less than a preset threshold, that is, an object type of the photographed object at this time is a photograph.

Figure 12:
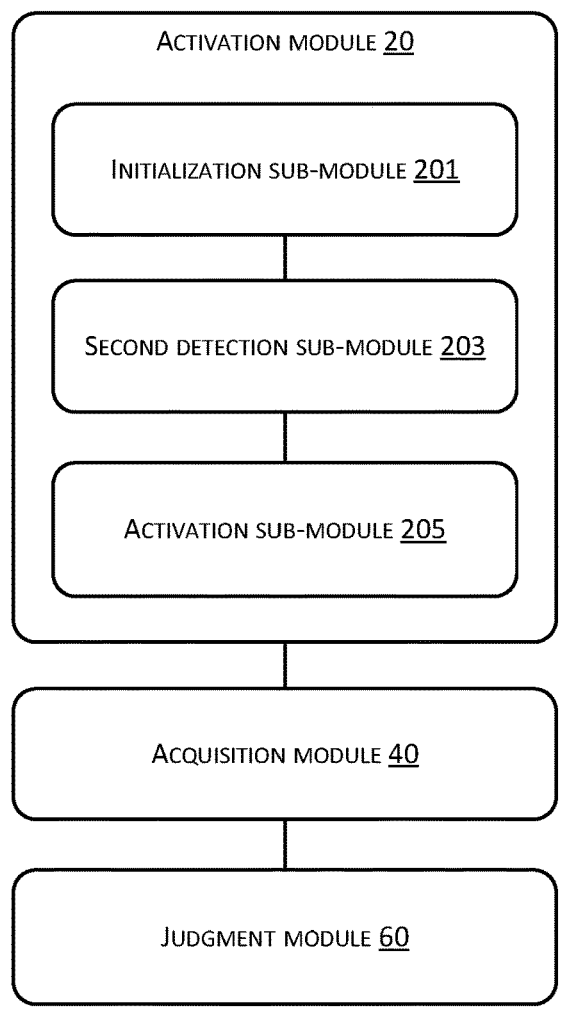
FIG. 12 is a schematic diagram of a fourth alternative apparatus for recognizing a photographed object according to the embodiments of the present application.

In the above embodiments of the present application, as shown in FIG. 12, the activation module 20 includes an initialization sub-module 201 configured to initialize the photographing device of the terminal in response to receiving the photographing instruction; a second detection sub-module 203 configured to detect whether the photographing device of the terminal supports an auto-focus mode after the photographing device is initialized;

and an activation sub-module 205 configured to activate the auto-focus mode of the photographing device so that the photographing device automatically focuses on the photographed object in an event that the photographing device of the terminal supports the auto-focus mode is detected.

Figure 13:
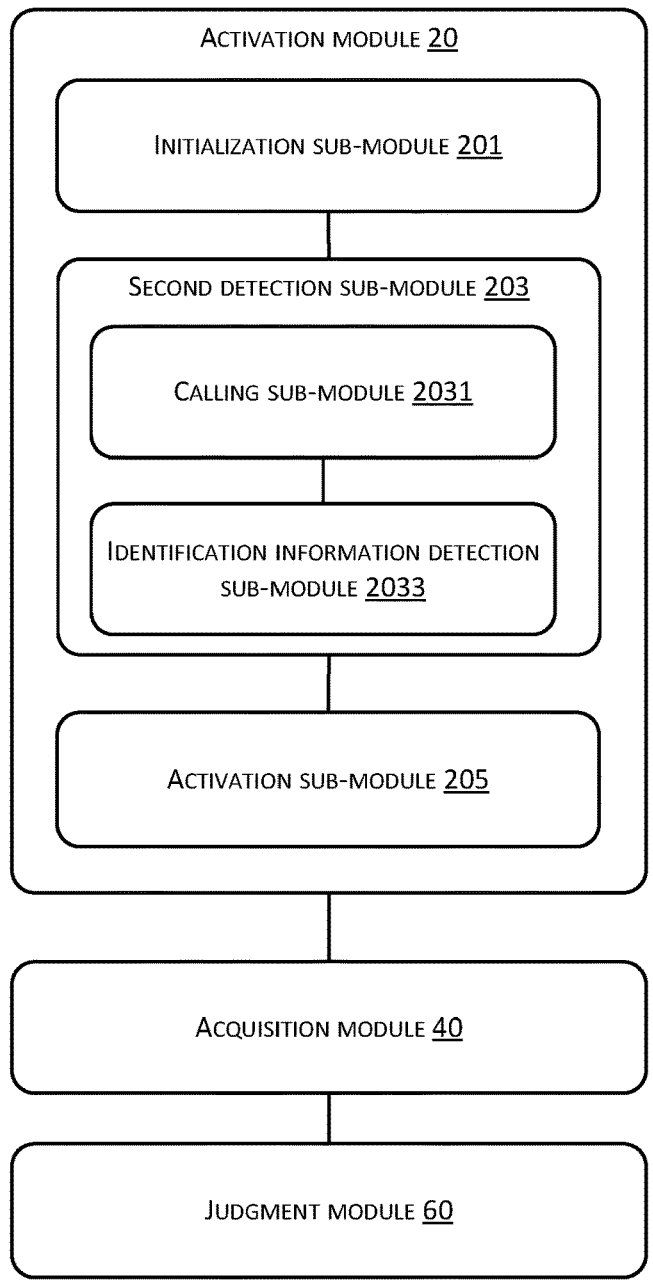
FIG. 13 is a schematic diagram of a fifth alternative apparatus for recognizing a photographed object according to the embodiments of the present application.

Furthermore, as shown in FIG. 13, the second detection sub-module 203 includes a calling sub-module 2031 configured to call a focus mode list of the photographing device; and an identification information detection sub-module 2033 configured to detect that the photographing device of the terminal supports an auto-focus mode if identification information of the auto-focus mode exists in the focus mode list.

Specifically, when a user needs to take a photograph, the user clicks a start-to-capture button to open a camera of a mobile phone in a mobile phone application, and initialize the camera by calling Camera.open( ). When the camera is successfully initialized, a determination is made as to whether the phone supports an auto-focus mode. A way of determination is to call Camera. Parameters. Get Supported Focus Modes( ). This method returns a list (i.e., a focus mode list as described above). When the returned focus mode list includes FOCUS_MODE_AUTO or FOCUS-_MODE_MACRO (i.e., identification information of an auto-focus mode as described above), this represents that the mobile phone supports the auto-focus mode. When the mobile phone supports the auto-focus mode, the auto-focus mode of the mobile phone is activated, set a focus mode parameter of the camera of the mobile phone is set as FOCUS_MODE_AUTO, with a calling method as Camera. Parameters. Set Focus Mode(FOCUS_MODE_AUTO). When focusing is successful, a system will automatically call a callback function cb to return a post-focusing focal distance.

A service process of Taobao authentication for opening a shop is used as an example to describe the above embodiments of the present application in detail.

An application of a mobile phone (such as Ali Money Shield) prompts a user to take a portrait photograph, and the user needs to click a start-to-capture button. When the user opens a camera of the mobile phone in the application of the mobile phone, an interface of an Android system starts to initialize the camera. In an event that the camera is successfully initialized, a determination is made as to whether the mobile phone supports an auto-focus mode. Specifically, in a situation in which a focus mode list is retrieved and two types of modes (FOCUS_MODE_AUTO and FOCUS-_MODE_MACRO) are included in the focus mode list, a determination is made that the mobile phone supports the auto-focus mode. After auto-focusing of the mobile phone is successful, a system automatically calls a callback function of the focusing that is set to return a post-focusing focal distance. When the user clicks on a capture button, the camera of the mobile phone collects an image, and the mobile phone terminal generates image data corresponding to the image. The image data includes information of the post-focusing focal distance and information of an object distance corresponding to information of the focal distance. The system of the mobile phone transmits the generated image data to a server of the application of the mobile phone (such as Ali money shield) through a network. The server determines whether the captured object is a photograph or a real person based on the data sent by the terminal, and thereby determines whether an identity of the user is authentic and valid.

In the above embodiments, using relevant software interface provided by an Android system to acquire a focal distance of an auto-focus of a camera, a post-focusing focal distance of a camera of a mobile phone is returned. Based on this focal distance, an object type of a photographed object can be determined. The above embodiment has been tested and successfully implemented in a Samsung Galaxy Nexus handset.

It should be noted that the solutions of the present application may be used on a terminal that is installed with an Android operating system, or may be used on a terminal that is installed with an iOS (an abbreviation of iPhone Operating System, i.e., Apple's iOS operating system) operating system, and has an interface to obtain a focal distance when taking a photograph.

Information about a focal distance of an auto-focus of a camera can be obtained through a system interface on a terminal installed with an Android operating system.

Through the above embodiments, based on principles of optical imaging and imaging principles of a camera of an existing mobile phone, a post-focusing focal distance is derived. A distance between the camera of the mobile phone and a photographed object is obtained based on the focal distance. This distance is used to determine whether the photographed object is in a very close distance, that is, a final determination of whether it is the minimum distance necessary for a real person to take a half-length photograph. Compared with existing methods for recognizing a remade photograph, these solutions do not require additional hardware on a basis of a photographing device, and a software process is relatively simple, thus simplifying a process of recognizing a remade photograph, and solving the problem of high complexity of the schemes for recognizing a remade photograph in the existing technologies, so as to realize efficient recognition of remade photographs.

Third Embodiment

According to the embodiments of the present application, an embodiment of a mobile terminal is further provided. The mobile terminal includes the apparatus for recognizing a photographed object in the second embodiment.

Figure 14:
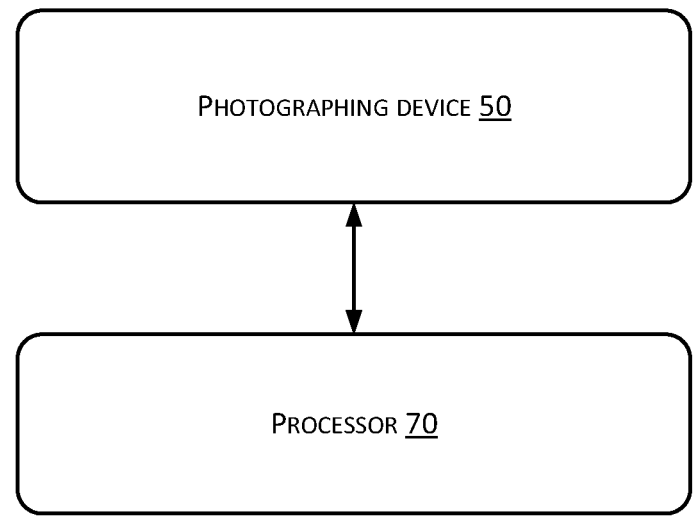
FIG. 14 is a schematic diagram of an alternative mobile terminal according to the embodiments of the present application.

Specifically, as shown in FIG. 14, the mobile terminal includes a photographing device 50 and a processor 70. The photographing device 50 is configured to activate in response to receiving a photographing instruction, and automatically focus on a photographed object. The processor 70 is configured to acquire a post-focusing focal distance of the photographing device after the photographing device successfully focuses on the photographed object, and determine whether an object type of the photographed object is a photograph based on the post-focusing focal distance.

Using the embodiments of the present application, an auto-focus function of a photographing device of a terminal is used. After the photographing device successfully focuses on a photographed object, a determination is made as to whether an object type of the photographed object is a photograph based on a focal distance after the photographing device sets a focus. According to the foregoing embodiments, whether an object type of a photographed object is a photograph can be determined by using a focal distance after auto-focusing by a photographing device. Compared with the methods for recognizing a remade photograph in the existing technologies, no additional hardware is required on a basis of a photographing device, and a software process is relatively simple, simplifying a process of recognizing a remade photograph, solving the technical problem of the high complexity of the schemes for recognizing a remade photograph in the existing technologies, and implementing highly efficient recognition of a remade photograph.

The above-mentioned focusing refers to an operation mode that changes a distance between an imaging surface and the lens according to differences in positions of clear images formed at the rear of the lens for different objects, that is, by changing an image distance to change the sharpness of a resulting image.

Specifically, when a user needs to take a photo, a photographing device of a terminal (such as a camera of a mobile phone) is activated. Using an auto-focus function of the photographing device, an auto-focus algorithm will drive a focusing motor to move an image sensor back and forth when a camera of the photographing device enters an auto-focus mode, to achieve the purpose of focusing to take and capture a clear image. Since a size of a photo is much smaller than a size of a real person, when taking a photo of a real people or remaking a photo, a distance between a photos and a camera of a photographing device is much smaller than a distance between the real people and the camera if sizes of imaging photos on a terminal are close to each other. This is reflected in the imaging formula, that is, an existence of a difference in object distances. Therefore, this difference in distances can be used to determine whether an object type of a photographed object of a photographing device is a photo or a real person.

Fourth Embodiment

According to the embodiments of the present application, an embodiment of a camera which includes the apparatus for recognizing a photographic subject in the second embodiment is also provided.

Figure 15:
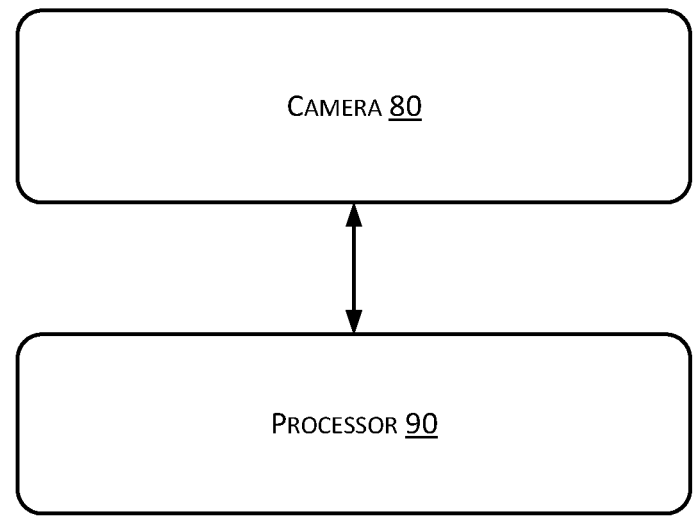
FIG. 15 is a schematic diagram of an alternative camera according to the embodiments of the present application.

Specifically, as shown in FIG. 15, the camera includes a camera 80 and a processor 90. The camera 80 is configured to activate in response to receiving a photographing instruction, and automatically focus on a photographed object. The processor 90 is configured to acquire a post-focusing focal distance of the photographing device after the photographing device successfully focuses on the photographed object, and determine whether an object type of the photographed object is a photograph based on the post-focusing focal distance.

Using the embodiments of the present application, an auto-focus function of a photographing device of a terminal is used. After the photographing device successfully focuses on a photographed object, a determination is made as to whether an object type of the photographed object is a photograph based on a focal distance after the photographing device sets a focus. According to the foregoing embodiments, whether an object type of a photographed object is a photograph can be determined by using a focal distance after auto-focusing by a photographing device. Compared with the methods for recognizing a remade photograph in the existing technologies, no additional hardware is required on a basis of a photographing device, and a software process is relatively simple, simplifying a process of recognizing a remade photograph, solving the technical problem of the high complexity of the schemes for recognizing a remade photograph in the existing technologies, and implementing highly efficient recognition of a remade photograph.

The above-mentioned focusing refers to an operation mode that changes a distance between an imaging surface and the lens according to differences in positions of clear images formed at the rear of the lens for different objects, that is, by changing an image distance to change the sharpness of a resulting image.

Specifically, when a user needs to take a photo, a photographing device of a terminal (such as a camera of a mobile phone) is activated. Using an auto-focus function of the photographing device, an auto-focus algorithm will drive a focusing motor to move an image sensor back and forth when a camera of the photographing device enters an auto-focus mode, to achieve the purpose of focusing to take and capture a clear image. Since a size of a photo is much smaller than a size of a real person, when taking a photo of a real people or remaking a photo, a distance between a photos and a camera of a photographing device is much smaller than a distance between the real people and the camera if sizes of imaging photos on a terminal are close to each other. This is reflected in the imaging formula, that is, an existence of a difference in object distances. Therefore, this difference in distances can be used to determine whether an object type of a photographed object of a photographing device is a photo or a real person.

Fifth Embodiment

The embodiments of the present application may provide a computer terminal, which may be any computer terminal device in a group of computer terminals. Optionally, in the present embodiment, the foregoing computer terminal may also be replaced with a terminal device such as a mobile terminal.

Optionally, in the present embodiment, the foregoing computer terminal may be located in at least one of a plurality of network devices of a computer network.

In the present embodiment, the computer terminal may execute program codes of the following operations in a method for recognizing a photographed object: starting a photographing device of a terminal to auto-focus a photographed object in response to receiving a photographing instruction; obtaining a post-focusing focal distance of the photographing device after the photographing device successfully focuses on the photographed object; and determining whether an object type of the photographed object is a photograph based on the post-focusing focal distance.

Figure 16:
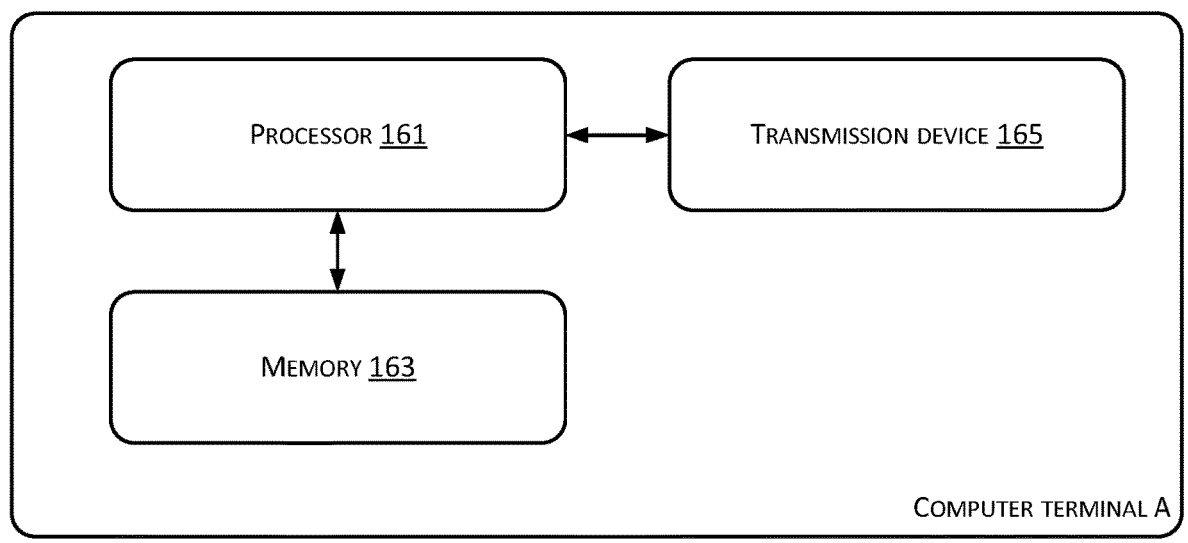
FIG. 16 is a structural block diagram of a computer terminal according to the embodiments of the present application.

Optionally, FIG. 16 is a structural block diagram of a computer terminal according to the embodiments of the present application. As shown in FIG. 16, the computer terminal A may include one or more (only one shown in the figure) processors 161, memory 163, and a transmission device 165.

The memory may be configured to store software programs and modules of application software, such as program instructions/modules corresponding to the method of recognizing a photographed object in the embodiments of the present application. The processor executes various functions, applications and data processing, i.e., the above-described method of recognizing the photographed object by running software program(s) and module(s) stored in the memory. The memory may include a high-speed random access memory, and may also include a non-volatile memory such as one or more magnetic storage devices, flash memory, or other non-volatile solid-state memory. In some examples, the memory may further include storage devices remotely disposed with respect to the processor. These storage devices may be connected to the terminal A via a network. Examples of such networks include, but are not limited to, the Internet, an intranet, a local area network, a mobile communications network, and a combination thereof.

The processor can execute the following operations by calling information and an application program stored in the memory through the transmission device: activating a photographing device of a terminal to auto-focus a photographed object in response to receiving a photographing instruction; obtaining a post-focusing focal distance of the photographing device after the photographing device successfully focuses on the photographed object; and determining whether an object type of the photographed object is a photograph based on the post-focusing focal distance.

Optionally, the processor can also execute the following operations: determining whether the object type of the photographed object is a photograph based on the post-focusing focal distance, which includes determining whether a distance between the photographing device and the photographed object is less than a preset threshold based on the post-focusing focal distance, where the preset threshold is used for representing a minimum distance needed for a photographing device to capture a living object, and the object type includes a living object and a photograph; and determining that the object type of the photographed object is a photograph if the distance between the photographing device and the photographed object is less than the preset threshold.

Optionally, the processor can also execute the following operations: determining whether the object type of the photographed object is a photograph based on the post-focusing focal distance, which includes determining whether a distance between the photographing device and the photographed object is less than a preset threshold based on the post-focusing focal distance, where the preset threshold is a minimum distance needed for the photographing device to capture a live object, and the object type includes a live object and a photograph; obtaining image data of the photographed object generated according to the photographing instruction if the distance between the photographing device and the photographed object is less than a preset threshold; detecting whether pre-acquired remade photograph feature(s) exist(s) in the image data; and determining that the object type of the photographing object is a photograph if pre-acquired remade photograph feature(s) exist(s) in the image data.

Optionally, the processor can also execute the following operations: determining whether the distance between the photographing device and the photographed object is less than the preset threshold based on the post-focusing focal distance, which includes determining whether the post-focusing focal distance is within a specified zoom range of the photographing device, where the specified zoom range corresponds to the preset threshold; and determining that the distance between the photographing device and the photographed object is less than the preset threshold if the post-focusing focal distance is within the specified zoom range of the photographing device.

Optionally, the processor can also execute the following operations: activating the photographing device of the terminal to auto-focus the photographed object, which includes initializing the photographing device of the terminal in response to receiving the photographing instruction; detecting whether the photographing device of the terminal supports an auto-focus mode after the photographing device is initialized; and activating the auto-focus mode of the photographing device so that the photographing device automatically focuses on the photographed object in an event that the photographing device of the terminal supports the auto-focus mode is detected.

Optionally, the processor can also execute the following operations: detecting whether the photographing device of the terminal supports the auto-focus mode, which includes calling a focus mode list of the photographing device; and detecting that the photographing device of the terminal supports an auto-focus mode if identification information of the auto-focus mode exists in the focus mode list.

Using the embodiments of the present application, an auto-focus function of a photographing device of a terminal is used. After the photographing device successfully focuses on a photographed object, a determination is made as to whether an object type of the photographed object is a photograph based on a focal distance after the photographing device sets a focus. According to the foregoing embodiments, whether an object type of a photographed object is a photograph can be determined by using a focal distance after auto-focusing by a photographing device. Compared with the methods for recognizing a remade photograph in the existing technologies, no additional hardware is required on a basis of a photographing device, and a software process is relatively simple, simplifying a process of recognizing a remade photograph, solving the technical problem of the high complexity of the schemes for recognizing a remade photograph in the existing technologies, and implementing highly efficient recognition of a remade photograph.

One of ordinary skill in the art can understand that the structure shown in FIG. 16 is only illustrative, and the computer terminal may also be a smartphone (such as an Android mobile phone, an iOS mobile phone, etc.), a tablet computer, a handheld computer, and a mobile Internet device (MID), a PAD, and other terminal devices. FIG. 16 does not limit the structure of the above electronic device. For example, the computer terminal A may also include more or fewer components (such as a network interface, a display device, etc.) than the one shown in FIG. 16, or have a different configuration from the one shown in FIG. 16.

One of ordinary skill in the art can understand that all or some operations of each method in the above embodiments can be accomplished through a program instructing related hardware of a terminal device. The program may be stored in a computer-readable storage media, and the storage media may include a flash drive, Read-Only Memory (ROM), Random Access Memory (RAM), a magnetic disk, or an optical disk, etc.

Sixth Embodiment

The embodiments of the present application also provide a storage media. Optionally, in the present embodiment, the storage media may be configured to store program codes executed by the method for recognizing a photographed object provided in the first embodiment.

Optionally, in the present embodiment, the storage media may be located in any computer terminal in a computer terminal group in a computer network, or located in any mobile terminal in a mobile terminal group.

Optionally, the storage media is configured to store program codes that are used for executing the following operations: activating a photographing device of a terminal to auto-focus a photographed object in response to receiving a photographing instruction; obtaining a post-focusing focal distance of the photographing device after the photographing device successfully focuses on the photographed object; and determining whether an object type of the photographed object is a photograph based on the post-focusing focal distance.

Optionally, the storage media is also configured to store program codes that are used for executing the following operations: determining whether the object type of the photographed object is a photograph based on the post-focusing focal distance, which includes determining whether a distance between the photographing device and the photographed object is less than a preset threshold based on the post-focusing focal distance, where the preset threshold is used for representing a minimum distance needed for a photographing device to capture a living object, and the object type includes a living object and a photograph; and determining that the object type of the photographed object is a photograph if the distance between the photographing device and the photographed object is less than the preset threshold.

Optionally, the storage media is also configured to store program codes that are used for executing the following operations: determining whether the object type of the photographed object is a photograph based on the post-focusing focal distance, which includes determining whether a distance between the photographing device and the photographed object is less than a preset threshold based on the post-focusing focal distance, where the preset threshold is a minimum distance needed for the photographing device to capture a live object, and the object type includes a live object and a photograph; obtaining image data of the photographed object generated according to the photographing instruction if the distance between the photographing device and the photographed object is less than a preset threshold; detecting whether pre-acquired remade photograph feature(s) exist(s) in the image data; and determining that the object type of the photographing object is a photograph if pre-acquired remade photograph feature(s) exist(s) in the image data.

Optionally, the storage media is also configured to store program codes that are used for executing the following operations: determining whether the distance between the photographing device and the photographed object is less than the preset threshold based on the post-focusing focal distance, which includes determining whether the post-focusing focal distance is within a specified zoom range of the photographing device, where the specified zoom range corresponds to the preset threshold; and determining that the distance between the photographing device and the photographed object is less than the preset threshold if the post-focusing focal distance is within the specified zoom range of the photographing device.

Optionally, the storage media is also configured to store program codes that are used for executing the following operations: activating the photographing device of the terminal to auto-focus the photographed object, which includes initializing the photographing device of the terminal in response to receiving the photographing instruction; detecting whether the photographing device of the terminal supports an auto-focus mode after the photographing device is initialized; and activating the auto-focus mode of the photographing device so that the photographing device automatically focuses on the photographed object in an event that the photographing device of the terminal supports the auto-focus mode is detected.

Optionally, the storage media is also configured to store program codes that are used for executing the following operations: detecting whether the photographing device of the terminal supports the auto-focus mode, which includes calling a focus mode list of the photographing device; and detecting that the photographing device of the terminal supports an auto-focus mode if identification information of the auto-focus mode exists in the focus mode list.

Using the embodiments of the present application, an auto-focus function of a photographing device of a terminal is used. After the photographing device successfully focuses on a photographed object, a determination is made as to whether an object type of the photographed object is a photograph based on a focal distance after the photographing device sets a focus. According to the foregoing embodiments, whether an object type of a photographed object is a photograph can be determined by using a focal distance after auto-focusing by a photographing device. Compared with the methods for recognizing a remade photograph in the existing technologies, no additional hardware is required on a basis of a photographing device, and a software process is relatively simple, simplifying a process of recognizing a remade photograph, solving the technical problem of the high complexity of the schemes for recognizing a remade photograph in the existing technologies, and implementing highly efficient recognition of a remade photograph.

Figure 17:
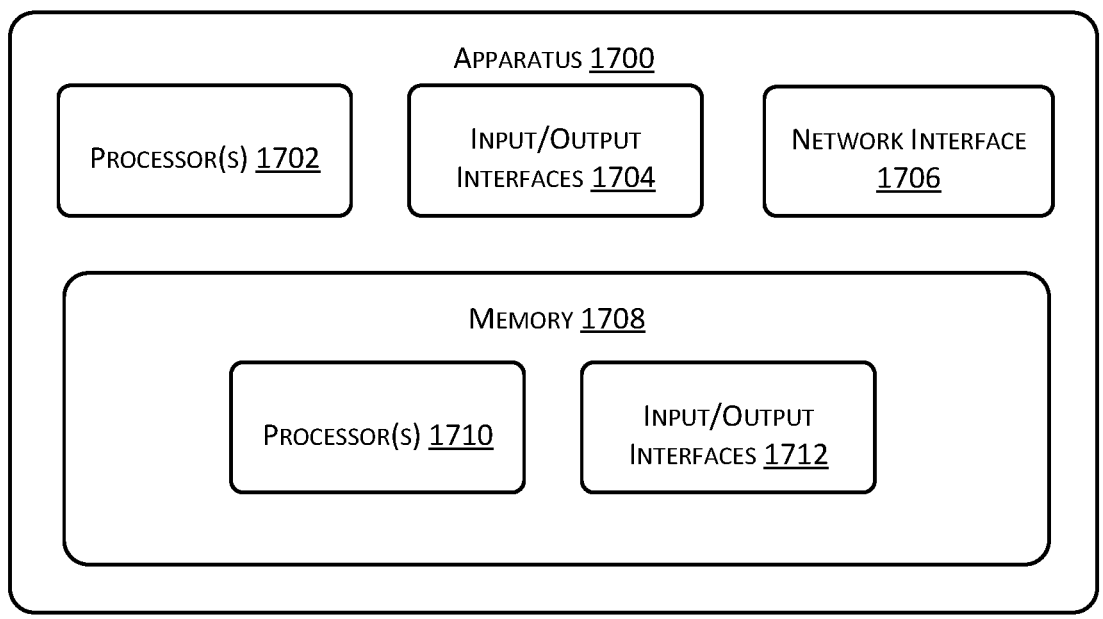
FIG. 17 is a structural block diagram of the apparatuses as described in FIGS. 8-13 in further detail.

In implementations, FIG. 17 shows a structural block diagram of an example apparatus 1700 such as the apparatuses as described in FIGS. 8-13 in more detail. In implementations, the apparatus 1700 may include one or more computing devices. In implementations, the apparatus 1700 may be a part of one or more computing devices, e.g., implemented or run by the one or more computing devices. In implementations, the one or more computing devices may be located in a single place or distributed among a plurality of network devices over a network. In implementations, the apparatus 1700 may also include one or more processors 1702, an input/output (I/O) interface 1704, a network interface 1706, and memory 1708.

The memory 1708 may include a form of computer readable media such as a volatile memory, a random access memory (RAM) and/or a non-volatile memory, for example, a read-only memory (ROM) or a flash RAM. The memory 1708 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 1708 may include program modules 1710 and program data 1712. The program modules 1710 may include one or more of the foregoing modules or sub-modules as described in FIGS. 8-13.

Sequence numbers of the foregoing embodiments of the present application are only meant for description, and do not represent the qualities of the embodiments.

In the foregoing embodiments of the present application, the description of each embodiment has its own emphasis.

Portions that are not described in detail in an embodiment can be referenced to the relevant description of other embodiments.

In the embodiments provided by the present application, it should be understood that the disclosed technical content may be implemented in other manners. The apparatus embodiments described above are only illustrative. For example, the division of units is only a division of logical functions, and other manners of division may exist in a real implementation. For example, multiple units or components may be combined or integrated into another system, or some features can be ignored or not be implemented. In addition, mutual coupling or direct coupling or communication connection that is illustrated or discussed may be indirect coupling or communication connection through some interfaces, units or modules, and may be in electrical or other forms.

The units described as separate components may or may not be physically separated. The components displayed as units may or may not be physical units, that is, may be located in one place, or may be distributed on multiple network units. Some or all of the units may be selected according to actual requirements to achieve the purpose of the solutions of the present embodiments.

In addition, various functional units in each embodiment of the present application may be integrated in a single processing unit. Alternatively, each unit may exist alone physically. Alternatively, two or more units may be integrated in a single unit. The above integrated unit can be implemented either in a form of hardware or software.

If implemented in a form of a software functional unit and sold or used as a stand-alone product, the integrated unit may be stored in a computer-readable storage media. Based on such understanding, an essence of the technical solutions of the present application, the part contributing to the existing technologies, or all or some of the technical solutions can be embodied in a form of a software product stored in a storage media, and include instructions to cause a computer device (which may be a personal computer, a server, a network device, or the like) to perform all or some of the operations of the method described in each embodiment of the present application. The storage media includes various types of media capable of storing program codes such as a flash disk, a Read-Only Memory (ROM), a Random Access Memory (RAM), a removable hard disk, a magnetic disk, an optical disk.

The above description shows only preferred embodiments of the present application. It should be pointed out that, for one of ordinary skill in the art, a number of improvements and modifications can be made without departing from the principles of the present application. These improvements and modifications should also be regarded as the scope of protection of the present application.

What is claimed is:

1. A method comprising:
   activating a photographing device of a terminal to focus a photographed object in response to receiving a photographing instruction;
   obtaining a post-focusing focal distance of the photographing device after the photographing device successfully focuses on the photographed object;
   determining whether the post-focusing focal distance is less than a maximum value of a software zoom range of the photographing device; and
   determining whether an object type of the photographed object is a photograph based on whether the post-focusing focal distance is less than the maximum value of the software zoom range of the photographing device.

2. The method of claim 1, wherein determining whether the object type of the photographed object is the photograph further comprises:
   determining whether a distance between the photographing device and the photographed object is less than a preset threshold based on the post-focusing focal distance, where the preset threshold is used for representing a minimum distance needed for the photographing device to capture a living object; and
   determining that the object type of the photographed object is the photograph if the distance between the photographing device and the photographed object is less than the preset threshold.

3. The method of claim 1, wherein determining whether the object type of the photographed object is the photograph further comprises determining whether a distance between the photographing device and the photographed object is less than a preset threshold based on the post-focusing focal distance, wherein the preset threshold is a minimum distance needed for the photographing device to capture a live object.

4. The method of claim 1, wherein determining whether the object type of the photographed object is the photograph further comprises:
   obtaining image data of the photographed object generated according to the photographing instruction if the distance between the photographing device and the photographed object is less than a preset threshold;
   detecting whether one or more pre-acquired remade photograph features exist in the image data; and
   determining that the object type of the photographing object is a photograph if the one or more pre-acquired remade photograph features exist in the image data.

5. The method of claim 1, wherein activating the photographing device of the terminal to focus the photographed object comprises:
   initializing the photographing device of the terminal in response to receiving the photographing instruction;
   detecting whether the photographing device of the terminal supports an auto-focus mode after the photographing device is initialized; and
   activating the auto-focus mode of the photographing device so that the photographing device automatically focuses on the photographed object in an event that the photographing device of the terminal supports the auto-focus mode is detected.

6. The method of claim 5, wherein detecting whether the photographing device of the terminal supports the auto-focus mode comprises:
   calling a focus mode list of the photographing device; and
   detecting that the photographing device of the terminal supports an auto-focus mode if identification information of the auto-focus mode exists in the focus mode list.

7. An apparatus comprising:
   one or more processors;
   memory;
   an activation module stored in the memory and executable by the one or more processors to activate a photographing device of a terminal to auto-focus a photographed object in response to receiving a photographing instruction;
   an acquisition module stored in the memory and executable by the one or more processors to obtain a post-focusing focal distance of the photographing device after the photographing device successfully focuses on the photographed object; and a judgment module stored in the memory and executable by the one or more processors to obtain image data of the photographed object, measure a light value associated with the photographed object, compare the measured light value associated with the photographed object with a reflection light value of a pre-acquired remade photograph, and determine that an object type of the photographed object is a photograph if the measured light value associated with the photographed object is greater than the reflection light value.

8. The apparatus of claim 7, wherein the judgment module comprises:

a judgment sub-module configured to determine whether a distance between the photographing device and the photographed object is less than a preset threshold based on the post-focusing focal distance, wherein the preset threshold is used for representing a minimum distance needed for the photographing device to capture a living object; and a first determination sub-module configured to determine that the object type of the photographed object is the photograph if the distance between the photographing device and the photographed object is less than the preset threshold.

9. The apparatus of claim 7, wherein the judgment module comprises:

a judgment sub-module configured to determine whether a distance between the photographing device and the photographed object is less than a preset threshold based on the post-focusing focal distance, wherein the preset threshold is a minimum distance needed for the photographing device to capture a live object;

an acquisition sub-module configured to obtain image data of the photographed object generated according to the photographing instruction if the distance between the photographing device and the photographed object is less than the preset threshold;

a first detection sub-module configured to detect whether one or more pre-acquired remade photograph features exist in the image data; and a second determination sub-module configured to determine that the object type of the photographing object is the photograph if the one or more pre-acquired remade photograph features exist in the image data.

10. The apparatus of claim 7, wherein the activation module comprises:

an initialization sub-module configured to initialize the photographing device of the terminal in response to receiving the photographing instruction;

a second detection sub-module configured to detect whether the photographing device of the terminal supports an auto-focus mode after the photographing device is initialized; and an activation sub-module configured to activate the auto-focus mode of the photographing device so that the photographing device automatically focuses on the photographed object in an event that the photographing device of the terminal supports the auto-focus mode is detected.

11. The apparatus of claim 10, wherein the second detection sub-module comprises:

a calling sub-module configured to call a focus mode list of the photographing device; and an identification information detection sub-module configured to detect that the photographing device of the terminal supports an auto-focus mode if identification information of the auto-focus mode exists in the focus mode list.

12. One or more computer readable media storing executable instructions that, when executed by one or more processors, cause the one or more processors to perform acts comprising:

activating a photographing device of a terminal to auto-focus a photographed object in response to receiving a photographing instruction;

obtaining a post-focusing focal distance of the photographing device after the photographing device successfully focuses on the photographed object;

measuring a light value associated with the photographed object;

comparing the measured light value associated with the photographed object with a reflection light value of a pre-acquired remade photograph;

determining whether the post-focusing focal distance is less than a maximum value of a software zoom range of the photographing device; and determining that an object type of the photographed object is a photograph when the measured light value associated with the photographed object is greater than the reflection light value or the post-focusing focal distance is less than a maximum value of a software zoom range of the photographing device.

13. The one or more computer readable media of claim 12, wherein determining that the object type of the photographed object is the photograph further comprises:

determining whether a distance between the photographing device and the photographed object is less than a preset threshold based on the post-focusing focal distance, wherein the preset threshold is used for representing a minimum distance needed for the photographing device to capture a living object; and determining that the object type of the photographed object is the photograph if the distance between the photographing device and the photographed object is less than the preset threshold.

14. The one or more computer readable media of claim 12, wherein determining whether the object type of the photographed object is the photograph further comprises:

obtaining image data of the photographed object generated according to the photographing instruction if a distance between the photographing device and the photographed object is less than a preset threshold;

detecting whether one or more pre-acquired remade photograph features exist in the image data; and determining that the object type of the photographing object is the photograph if the one or more pre-acquired remade photograph features exist in the image data.

15. The one or more computer readable media of claim 12, wherein activating the photographing device of the terminal to auto-focus the photographed object comprises:

initializing the photographing device of the terminal in response to receiving the photographing instruction;

detecting whether the photographing device of the terminal supports an auto-focus mode after the photographing device is initialized; and activating the auto-focus mode of the photographing device so that the photographing device automatically focuses on the photographed object in an event that the photographing device of the terminal supports the auto-focus mode is detected.

16. The one or more computer readable media of claim 15, wherein detecting whether the photographing device of the terminal supports the auto-focus mode comprises:
   calling a focus mode list of the photographing device; and
   detecting that the photographing device of the terminal supports an auto-focus mode if identification information of the auto-focus mode exists in the focus mode list.

* * * * *